Oct. 19, 1937.   G. W. BAUGHMAN   2,096,505
HIGH SPEED TRAIN BRAKE CONTROL
Filed Feb. 18, 1937   3 Sheets-Sheet 2
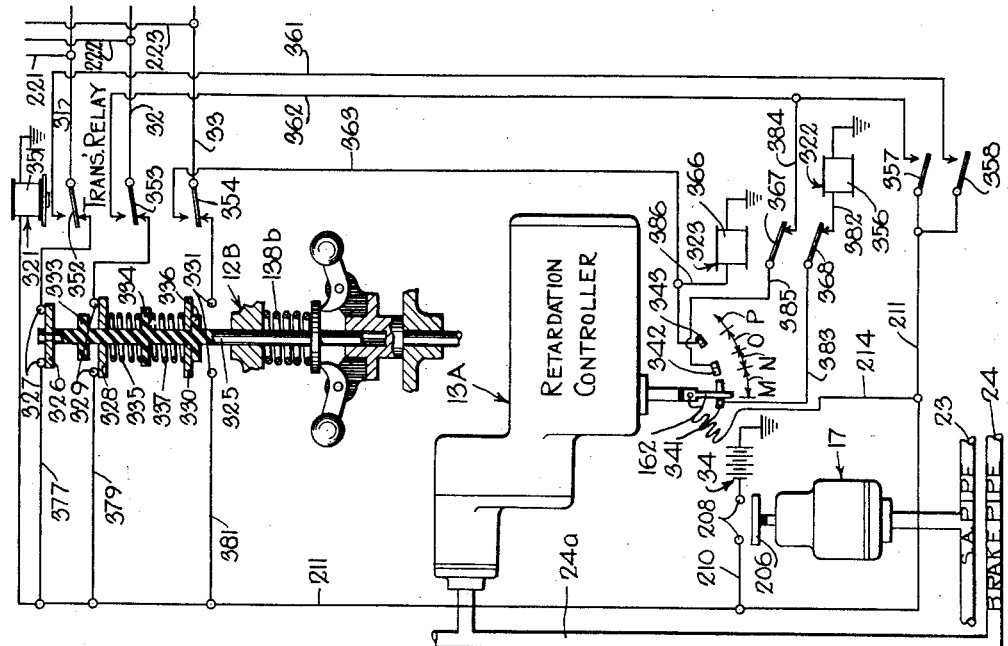
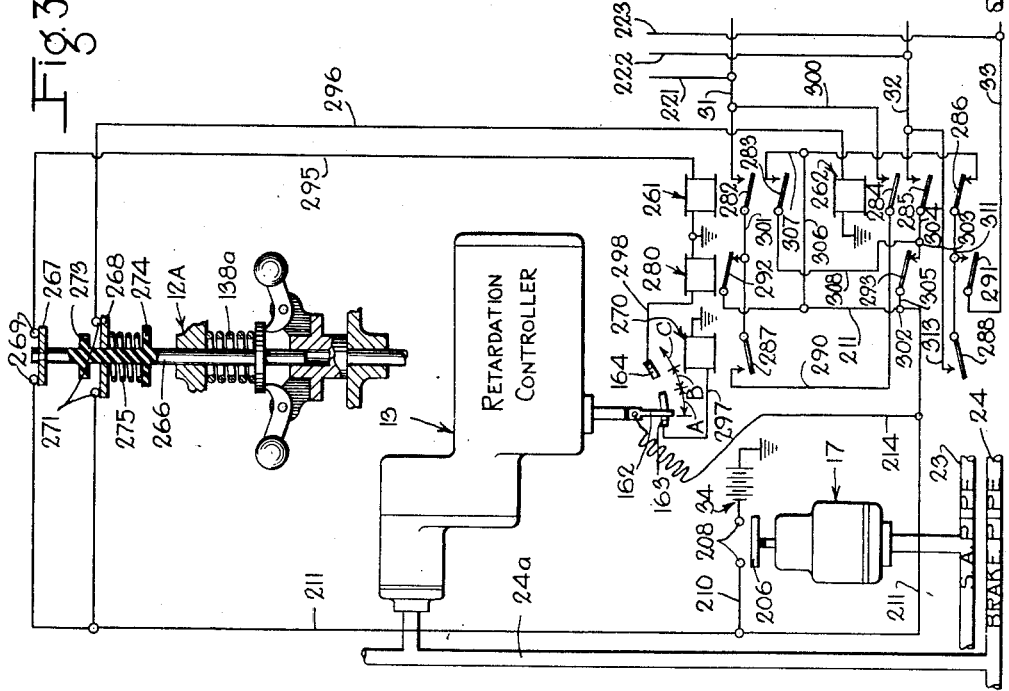
INVENTOR
GEORGE W. BAUGHMAN
BY Wm. M. Cady
ATTORNEY

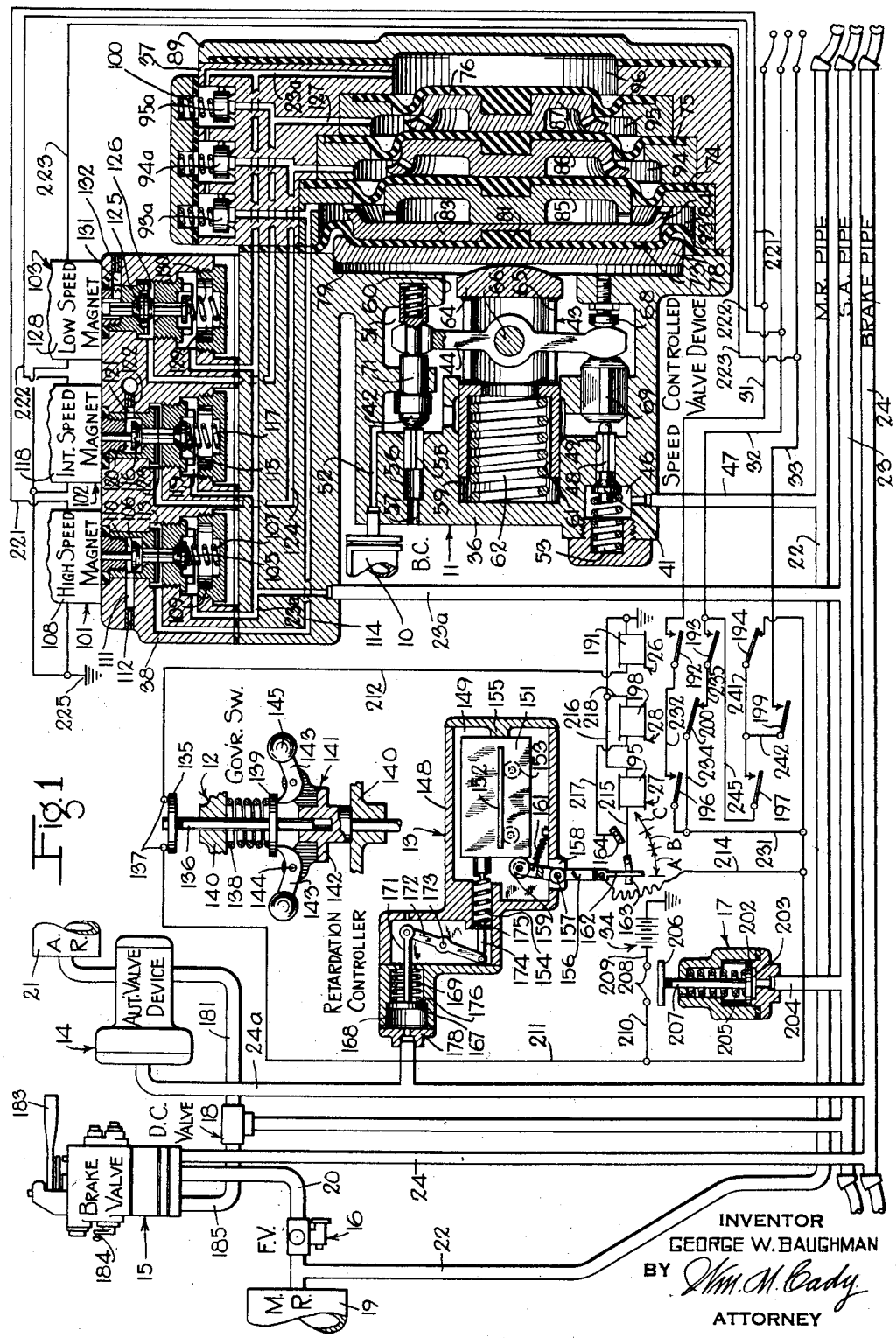

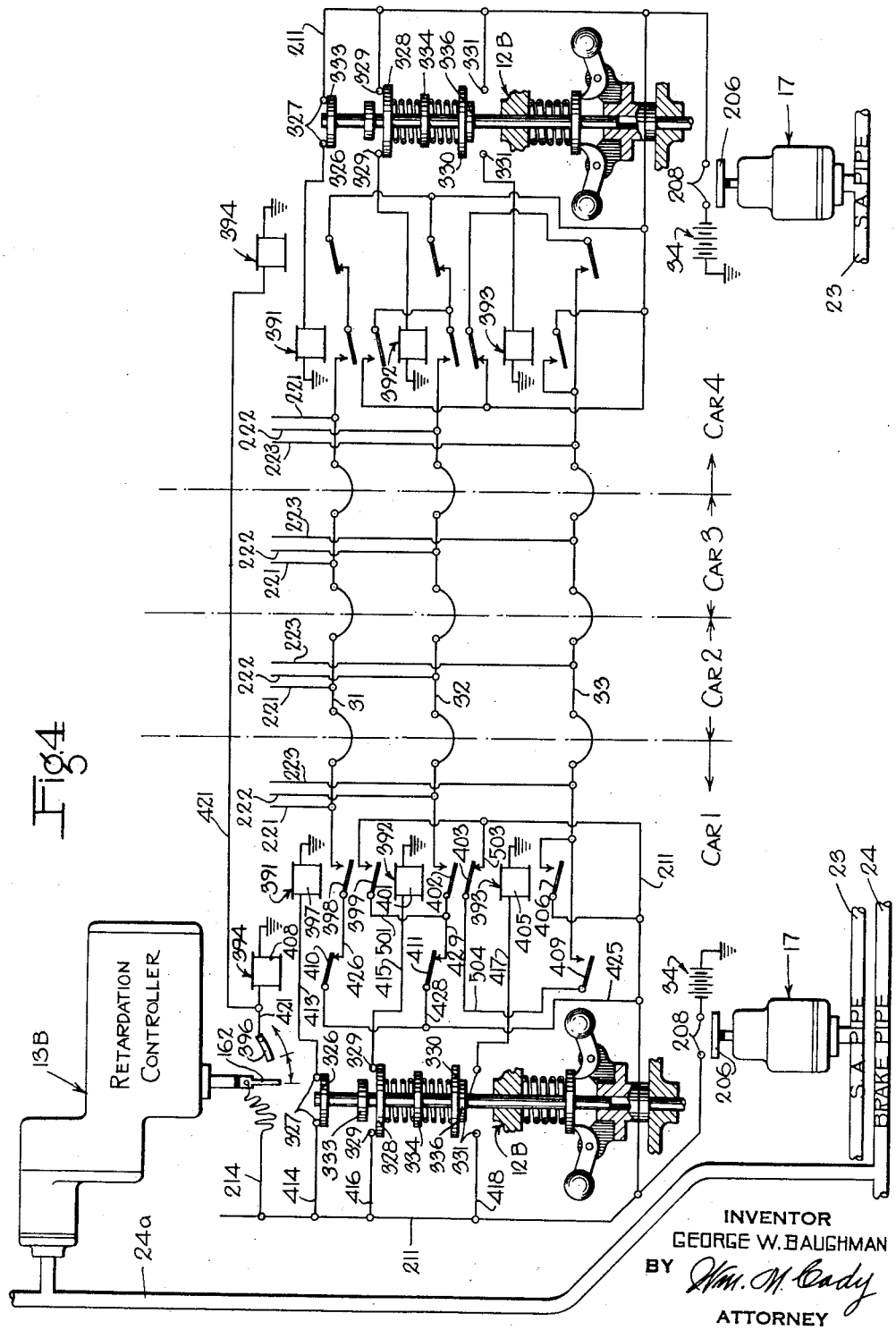

Patented Oct. 19, 1937

2,096,505

UNITED STATES PATENT OFFICE 2,096,505

HIGH SPEED TRAIN BRAKE CONTROL

George W. Baughman, Edgewood, Pa., assignor to The Westinghouse Air Brake Company, Wilmerding, Pa., a corporation of Pennsylvania Application February 18, 1937, Serial No. 126,375

29 Claims. (Cl. 303—21)

This invention relates to high speed train brake control and more particularly to brake control equipment including means for automatically controlling the brakes both according to the speed of the train and according to the rate of retardation of the train.

As is well understood by those skilled in the art, the coefficient of friction between a brake shoe and a car wheel increases as the speed of the car or train decreases. The rate of retardation of the car or train being in proportion to the retarding force, it will be apparent that the rate of retardation of a car or train will increase as the speed of the car or train decreases, assuming a constant braking force, due to the increase in the retarding force acting on the wheel caused by the increase in the coefficient of friction. If the braking force, that is, the force pressing the brake shoe to the car wheel, is sufficiently high, the retarding force tending to slow-down the rotative speed of the car wheel may increase sufficiently, as the speed of the car or train decreases, that the limit of adhesion between the car wheel and the track rail is exceeded. In such case, the car wheel becomes locked against rotation, despite the fact that the car or train continues to move along the rails, and thus slides along the rail and develops a flat spot, which is objectionable.

Accordingly, it has been proposed to employ inertia devices, of various types, which are responsive to an increase in the rate of retardation of the car or train caused in the above manner to relieve the braking force applying the brake shoe to the car wheel, thereby reducing the retarding force acting on the wheel and tending to prevent the sliding of the wheels.

It has been found, however, that inertia responsive devices or retardation controllers are not adequately effective to prevent sliding of the wheels in all cases. More recently, therefore, it has been proposed to provide a brake control equipment for high speed trains, which equipment is effective to control the degree of the braking force or brake cylinder pressure not only according to the rate of retardation of the car or train but also according to the speed or variations in speed of the train, so that even though the retardation controller might not be adequately effective to properly reduce the braking force to prevent sliding of the wheels, reduction in the braking force would be effected, in any event, according to the reduction in the speed of the car or train. Thus, by controlling the degree of braking force not only according to variations in the rate of retardation but also in accordance with variations in the speed of the train, sliding of the wheels is more effectively prevented.

An example of a brake control equipment for controlling the degree of braking force both according to the rate or variation in the rate of retardation and according to the speed or variation in the speed of the car or train is described and claimed in the copending application, Serial No. 115,943, of Donald L. McNeal, filed December 15, 1936, and assigned to the same assignee as is the present application. A characteristic of the equipment described in the copending application just mentioned is that the retardation controller is cut out of operation below a certain speed so that it cannot control the degree of braking force. It is desirable that the retardation controller remain effective at all speeds. Accordingly, it is an object of my present invention to provide a high speed train brake control equipment offering certain advantages over the equipment shown in the copending application above mentioned in respect to having a retardation controller effective in controlling the degree of the braking force for all speeds.

Another object of my invention is to provide a high speed train brake control equipment comprising speed-responsive means and a retardation controller cooperating in a novel manner in the control of the brakes.

Another object of my invention is to provide a high speed train brake control equipment, of the type which controls the brakes automatically according to speed and according to rate of retardation, wherein a retardation controller is effective to establish certain different uniform degrees of braking force or brake cylinder pressure, as long as the rate of retardation of the car or train is within a corresponding one of a plurality of different ranges of retardation rates, for each of a plurality of different speed ranges.

Another object of my invention is to provide a high speed train brake control equipment of the character described in the foregoing object, wherein the effect of the retardation controller is altered as between one type of brake application and another type of brake application.

Another object of my invention is to provide a high speed train brake control equipment which functions to control the degree of braking force automatically at one time according to variations in the speed of the train and at another time according to variations in the rate of retardation of the train.

A further object of my invention is to provide a high speed train brake control equipment, of the character indicated in the foregoing object, which is adapted to control the brakes automatically either according to variations in the speed of the train or according to variations in the rate of retardation of the train contingent upon the elapse of a certain uniform time after the application of the brakes is initiated.

The above objects, and other and more specific objects of my invention which will be made apparent hereinafter, are attained by means of several illustrative embodiments which will be described later and which are shown in the accompanying drawings, wherein, Fig. 1 is a simplified diagrammatic view, with parts thereof in section, illustrating one embodiment of my invention, Fig. 2 is a fragmentary diagrammatic view of a modified form of the equipment shown in Fig. 1, also embodying my invention Fig. 3 is a fragmentary diagrammatic view of another modification of the equipment shown in Fig. 1, embodying time-controlled means for determining whether the speed-controlled means or the inertia controlled means (retardation controller) exercises control of the braking force, and Fig. 4 is a fragmentary diagrammatic view of a further modification of the equipment shown in Fig. 1, wherein the number of speed ranges of the speed-controlled means and the number of ranges of rates of retardation of the retardation controller differ from that of the equipment shown in Fig. 1.

BRIEF DESCRIPTION OF EQUIPMENT SHOWN IN FIG. 1

Referring to Fig. 1, the brake control equipment shown comprises at least one brake cylinder 10, a speed-controlled valve device 11, for controlling the supply of fluid under pressure to and the release of fluid under pressure from the brake cylinder 10, a speed-controlled or governor switch device 12, an inertia device hereinafter called a retardation controller 13, an automatic valve device 14, a manually operated brake valve device 15, a feed valve device 16 of standard construction, a fluid-pressure-operated switch device 17, and a double check valve device 18.

Additional equipment may include a main reservoir 19, an auxiliary reservoir 21, a feed-valve pipe 20, and three pipes, hereinafter designated as the main reservoir pipe 22, the straight air pipe 23, and the brake pipe 24.

According to my invention, I further provide a so-called governor relay 26 controlled by the governor switch device 12, and two relays 27 and 28 which are controlled by the retardation controller 13. Also provided are three train wires, hereinafter designated as high speed wire 31, intermediate speed wire 32 and low speed wire 33, as well as a suitable source of electrical energy, illustrated in the form of a battery 34.

The brake control equipment shown in Fig. 1 is adapted for use on trains of the articulated or the non-articulated type, only so much equipment being shown as illustrates the operation in connection with a single brake cylinder, the control of the pressure in other brake cylinders associated with other wheel trucks and on other cars being effected in a manner indicated hereinafter and similar to that described for the equipment shown.

DETAILED DESCRIPTION OF EQUIPMENT SHOWN IN FIG. 1

(a).—Speed-controlled valve device 11

The speed-controlled valve device 11 represents, in simplified form, a type of speed-controlled valve device described in detail and claimed in the copending application, Serial No. 88,098, of Ellis E. Hewitt which was filed June 30, 1936 and assigned to the same assignee as is the present application, certain parts of the valve device shown and described in the copending application being omitted in the present application for the sake of simplicity. The speed-controlled valve device 11 comprises a valve section 36, a diaphragm section 37 and a magnet valve section 38.

Contained in the valve section 36 is a supply valve 41 and a release valve 42 which are operated by movement of a slidable member 43 through the medium of a pivoted lever 44 carried on the slidable member 43. The supply valve 41 is contained in a chamber 46 which is constantly connected to the main reservoir pipe 22 through a branch pipe 47, the valve 41 having a fluted stem 48 which operates slidably in a bore 49 connecting the chamber 46 to a chamber 51 which is constantly open to the brake cylinder 10 through a pipe and passage 52. A coil spring 53 contained in the chamber 46 and acting on the valve 41 yieldingly urges the valve 41 into seated relation on a cooperating valve seat to close the connection from the chamber 46 to the chamber 51.

The release valve 42 has a fluted stem 55 which operates slidably in a bore 56 opening at one end into the chamber 51 and at the opposite end to atmosphere through a port 57.

The slidable member 43 is formed at one end as a piston which operates slidably in a bore 59 in the casing which opens into the chamber 51. A recess 61 is formed at the piston end of the slidable member 43 for receiving a biasing spring 62, which is interposed between the casing and the slidable member and yieldingly urges the slidable member in the right-hand direction as vewed in Fig. 1.

As the opposite end of the slidable member 43 is a rounded head portion 64 the purpose of which will be hereinafter made clear, the portion of the slidable member 43 between the head portion 64 and the opposite piston end having a slot 65 formed therein. The aforementioned lever 44 is pivoted intermediate the opposite ends thereof on a pin 66 which extends transversely of the slot 65, the one end of the lever 44 extending in the upward direction through the slot opening and the opposite end extending in the downward direction through the slot opening.

The lower end of the lever 44 is rounded on opposite sides thereof and contacts on one side thereof an adjustable stop screw 68 and on the opposite side a floating spacer member 69 of fluted construction which is interposed between the inner end of the fluted stem 48 of the supply valve 41 and the lower end of the lever 44.

The upper end of the lever 44 is bifurcated and straddles a reduced portion of a stem 71 which is slidably mounted in the casing and which carries the release valve 42.

With the slidable member 43 in the position shown, the supply valve 41 is seated and the release valve 42 is unseated and consequently chamber 51 and brake cylinder 10 are connected to atmosphere through the exhaust port 57 so that the brakes are released. When the slidable member 43 is shifted in the left-hand direction by the application of force to the rounded head portion 64 in the manner to be hereinafter described, the lever 44 is pivoted in a counterclockwise direction, the lower end of the lever being firmly held between the adjustable stop screw 68 and the spacer member 69. As a result, the stem 71 and accordingly the release valve 42 are shifted in the left-hand direction until the release valve seats on its associated valve seat to close off the connection from the chamber 51 to atmosphere through the exhaust port 57. Thereafter, as the slidable member 43 continues to be shifted in the left-hand direction, the lever 44 pivots at the upper end thereof in a clockwise direction, thus actuating the lower end of the lever 44 to unseat the supply valve 41 and admit a supply of fluid under pressure from the main reservoir pipe 22 to the chamber 51 and thus to the brake cylinder 10.

When the slidable member 43 is thereafter shifted in the right-hand direction, the lever 44 is pivoted on the pin 60 in a counterclockwise direction to maintain the release valve 42 seated, due to spring 53 urging the supply valve 41 toward its seated position.

When the slidable member 43 is shifted sufficiently in the right-hand direction, to enable the supply valve 41 to be reseated on its associated valve seat, further return movement of the slidable member 43 in the right-hand direction causes the lever 44 to be pivoted in a clockwise direction, with the lower end thereof as a fulcrum point, thus causing the stem 71 to be shifted in the right-hand direction and unseating release valve 42 from its associated valve seat. Fluid under pressure is thus released from the brake cylinder 10 and the chamber 51, so that the brakes are accordingly released.

Contained in the casing section 37 are a plurality of movable abutments or diaphragms 73, 74, 75 and 76 of successively smaller effective pressure areas in the order named, the diaphragms being suitably clamped at the periphery thereof and disposed in spaced coaxial relation.

At one side of the largest diaphragm 73 is a follower plate or disc 78 which operates slidably in a bore 79 in the casing section 36, the bore 79 being open to the chamber 51 through an opening 60. The slidable member 43 for operating the supply and release valves 41 and 42 extends through the opening 60 and the rounded head portion 64 of the slidable member 43 engages the follower disc 78. Suitably attached to the opposite side of the diaphragm 73, as on one or more projections 81 formed on the diaphragm 73, is a follower member 83 having a perforated skirt or flange 84 which is adapted to contact the casing section 37 to limit the movement of the diaphragm 73 in the right-hand direction.

Suitably attached on the left-hand faces of the diaphragms 74, 75 and 76, in the manner of the attachment of the follower 83 to the diaphragm 73, are a plurality of follower or spacer discs 85, 86 and 87, respectively, each of which is suitably adapted, as by a peripheral flange and a central projection, to maintain a minimum spacing between the successive diaphragms. It will be noted that the diaphragms 73, 74, 75 and 76 are unconnected, so that the diaphragms are free to move individually or collectively, as the case might be.

The arrangement of the diaphragms 73, 74, 75 and 76 is such as to form a chamber 93 between the diaphragms 73 and 74, a chamber 94 between the diaphragms 74 and 75, a chamber 95 between the diaphragms 75 and 76, and a chamber 96 between the diaphragm 76 and a cover plate 89 secured to the end of the casing section 37. The chamber 96 is constantly connected to the straight-air pipe 23 through a branch pipe and passage 23a.

Interposed between the chambers 93, 94 and 95 and the passage 23a are check valves 93a, 94a and 95a, respectively, which are yieldingly biased into seated relation on an associated valve seat by lightly tensioned return springs 100. Whenever a reduction in the pressure of the fluid in the passage 23a occurs, as a result of a reduction in the pressure of the fluid in the straight-air pipe 23, the check valves 93a, 94a and 95a are unseated by the higher pressure in the chambers 93, 94 and 95 to cause substantially simultaneous reduction, to a corresponding degree, in the pressure of the fluid contained in the chambers 93, 94 and 95. The purpose of this feature will be understood more clearly from subsequent description.

The magnet valve casing section 38 contains three electromagnet valve devices, hereinafter designated the high speed magnet valve device 101, the intermediate speed magnet valve device 102, and the low speed magnet valve device 103, which serve to control the supply of fluid under pressure to and also the release of fluid under pressure from the chambers 93, 94 and 95, respectively.

The high speed magnet valve device 101 comprises a pair of oppositely seating valves, hereinafter designated the supply valve 105 and the release valve 106, which are yieldingly urged by a biasing spring 107 into seated and unseated positions respectively, and which are actuated against the force of the spring 107 into unseated and seated positions respectively, by energization of an electromagnet 108. The supply valve 105 is contained in a chamber 109 into which the passage 23a opens, and the release valve 106 is contained in a chamber 110 which is constantly open to the atmosphere through an exhaust passage 111 containing a fitting having a restricted passage 112.

Located between the chambers 109 and 110 is a chamber 113 which is constantly connected to the chamber 93 of the diaphragm casing section 37 through a passage 114.

It will thus be seen that when the electromagnet 108 is deenergized, as shown, and the supply valve and the release valve are seated and unseated respectively, supply valve 105 cuts off the supply of fluid under pressure from the straight-air pipe 23 to the chamber 93, and the chamber 93 is vented to atmosphere through the restricted passage 112 past the unseated release valve 106. When the electromagnet 108 is energized, the release valve 106 is seated to prevent exhaust of fluid under pressure from the chamber 93 and the supply valve 105 is unseated to cause fluid under pressure to be supplied therepast from the straight-air pipe 23 to the chamber 93.

The intermediate speed magnet valve device 102 is identical in construction with the high speed magnet valve device 101 and comprises a supply valve 115 and a release valve 116, yieldingly urged into seated and unseated positions, respectively, by a biasing spring 117 and actuated against the force of the spring 117 into unseated and seated positions, respectively, by energization of an electromagnet 118. The supply valve 115 is contained in a chamber 119 constantly connected to the passage 23a, and the release valve 116 is contained in a chamber 120 which is constantly open to atmosphere through an exhaust passage 121 containing a fitting having a restricted passage 122.

Located between the chambers 119 and 120 is a chamber 123 which is constantly connected to the chamber 94 through a passage 124.

When the electromagnet 118 is deenergized, the supply valve is seated to close off the supply of fluid under pressure from the straight-air pipe 23 to the chamber 94 and the release valve 116 is unseated to release fluid under pressure from the chamber 94 therepast through the restricted passage 122. When the electromagnet 118 is energized, the release valve 116 is seated to close off the exhaust of fluid under pressure from the chamber 94 and the supply valve 115 is unseated to cause fluid under pressure to be supplied from the straight-air pipe 23 to the chamber 94.

The low speed magnet valve device 103 comprises a double beat valve 125 which is contained in a chamber 126 constantly in communication with the chamber 95 of the diaphragm casing section 37 through a passage 127, the valve 125 being yieldingly urged by a spring 130 into seated relation on an upper valve seat and actuated against the force of the spring 130 into seated relation on a lower valve seat by an electromagnet 128.

When the electromagnet 128 is deenergized as shown, fluid under pressure is supplied from a chamber 129 which is constantly connected to the passage 23a, past the lower valve seat through the chamber 126 and thence to the chamber 95 in the diaphragm casing section 37. When the electromagnet 128 is energized, the supply of fluid under pressure from the straight-air pipe 23 to the chamber 95 is cut off at the lower seat of the valve 125 and fluid under pressure is released from the chamber 95 past the upper valve seat of the valve 125 through an exhaust passage 131 containing a fitting having a restricted passage 132.

(b).—Governor switch 12

The governor switch device 12 may be of any suitable construction and is illustrated diagrammatically, in simplified form, as comprising a contact bridging member 135 carried in insulated relation on a slidable stem 136 and adapted to engage a pair of insulated resilient contact fingers 137 in circuit-closing relation. A biasing spring 138 interposed between a collar or flange 139, fixed on the stem 136, and a portion of the casing 140, yieldingly urges the stem 136 in a direction to effect disengagement of the contact bridging member 135 from the contact fingers 137 and a centrifuge 141 urges the stem 136 upwardly, in opposition to the spring, toward and into contact with the contact fingers 137. The centrifuge device 141 comprises a rotary element 142 which is suitably journaled in a portion of the casing 140, the element 142 being rotated according to the speed of travel of the car or train in well known manner, as by gear or pulley and belt connection with an axle of the car or traction vehicle. A pair of levers 143 are pivoted intermediate the ends thereof on pins 144 carried by the element 142, and integrally formed or attached to the outer end of the levers 143 are weighted elements, such as fly-balls 145.

When the element 142 is rotated, the centrifugal force acting on the fly-balls 145 shifts the outer ends of the levers 143 outwardly thus causing the inner ends of the levers 143, which are in contact with the lower face of the flange 139 on the stem 136, to exert a force tending to overcome the spring 138 and to shift the stem 136 in a direction to effect engagement of the contact bridging member 135 with the contact fingers 137. The parts of the governor switch device 12 are so designed and the operation is such that the contact bridging member 135 engages the contact fingers 137 in circuit-closing relation only when the speed of travel of the car or train is a certain uniform chosen speed, such as forty miles per hour, and higher. The fly-balls 145 may attain their maximum outward movement at some speed in excess of the certain chosen speed so that the pressure of the contact member 135 on the contact fingers 137 is thereby limited.

(c).—Retardation controller device 13

The retardation controller device 13 is illustrative of any suitable form of device for effecting the same result and may comprise a casing 148 having a chamber 149 containing an inertia element 151, in the form of a heavy weight, which is suitably mounted for horizontal movement in the casing in a frictionless manner, as by the inertia element 151 being provided with a flange 152 on each of the opposite sides thereof, only one flange being shown, which flanges are supported on frictionless rollers 153 carried on the casing 148.

The retardation controller device 13 is mounted on the car or train in such manner that when the brakes are applied, the inertia element 151 shifts toward the head end of the train, corresponding to the left-hand direction in Fig. 1, against the force of a yielding spring 154.

The degree to which the inertia element 151 shifts in the left-hand direction from the normal position shown, in which the right-hand end of the element is maintained in contact with a stop lug 155 on the casing by the force of the spring 154, varies in direct proportion to the rate of retardation of the car or train.

A lever 156 is pivoted intermediate the opposite ends thereof on a pin 157 carried by the casing 148, the lever 156 extending through a slot 158 in the wall of the casing 148 so that one end thereof projects into the chamber 149 within the casing 148 and the opposite end projects to the exterior of the casing. The lever 156 is biased toward a normal position by a lightly tensioned return spring 161, the inner end of the lever having a roller 159 thereon which engages the left-hand end of the inertia element 151. When the brakes are applied, the inertia element 151 by shifting in the left-hand direction, causes the lever 156 to pivot in a counterclockwise direction on the pin 157.

Carried in insulated relation on the outer end of the lever 156 is a contact finger 162 which cooperatively engages and disengages a pair of stationary contact segments 163 and 164 which are arranged in spaced insulated relation along the arc of travel of the contact finger 162.

In the normal position of the contact finger 162 corresponding to the position of the inertia element 151 in contact with the stop lug 155 as shown, the contact finger 162 engages the contact segment 163. As the lever 156 rotates in a counterclockwise direction due to an increase in the rate of retardation, the contact finger 162 slides along the contact segment 163 and when the rate of retardation of the car or train has increased beyond a certain rate, the contact finger 162 disengages the segment 163.

The length of the contact segment 163 may be varied as desired so that the contact finger disengages the segment 163 when the rate of retardation increases to, for example, two miles per hour per second, the range from the zero rate of retardation corresponding to the normal position of the contact finger 162 to the point where the contact finger 162 disengages the segment 163 being hereinafter termed "range A" of retardation.

With further counterclockwise movement of the lever 156 in accordance with an increase in the rate of retardation, the contact finger 162 moves through an arc in which it engages neither the segment 163 nor the segment 164. Thus it is necessary that the rate of retardation of the train increase a predetermined uniform amount in excess of the rate at which the contact finger 162 disengages the contact segment 163 before the contact finger 162 engages the contact segment 164. This range of rates of retardation will be hereinafter designated "range B" and may be for example from two miles per hour per second to three miles per hour per second.

It will thus be seen that when the rate of retardation of the train exceeds a predetermined rate which is the maximum rate in range B, it engages the contact segment 164 and continues to engage the contact segment 164 thereafter as long as the rate of retardation of the train exceeds the maximum rate of retardation in range B. The range of rates of retardation in excess of the maximum in range B will be hereinafter referred to as range C and may include, for example, rates of retardation increasing from three miles per hour per second.

The retardation controller 13 functions in the manner described, for service applications of the brakes. For emergency applications of the brakes, however, suitable means is provided for increasing the initial tension of the spring 154 whereby to increase the force of the spring resisting the shifting of the inertia element 151 and to thus necessitate a greater rate of retardation to effect a corresponding movement of the contact finger 162. For example, a mechanism such as is described and claimed in the copending application Serial No. 717,213, of Ellis E. Hewitt, filed March 24, 1934, and assigned to the assignee of the present application, may be provided. Such mechanism comprises a piston 167 subject on one side to brake pipe pressure acting in a chamber 168 and on the opposite side to the opposing pressure of a spring 169. The piston 167 has a stem 171 which is pivotally connected to one end of a lever 172 which is pivoted intermediate the ends thereof, as on a pin 173 carried by the casing 148, the opposite end of the lever 172 having pivotally connected thereto a rod or stem 174 to which is fixed a stop flange or collar 175 against which one end of the spring 154 of the retardation controller acts.

The normal pressure to which the brake pipe is charged is effective to shift the piston 167 in the right-hand direction against the opposing force of the spring 169 into engagement with a stop shoulder 176 formed on the casing, the stop collar or flange 175 being accordingly positioned as shown so that the spring 154 is initially tensioned to a desired amount for service applications of the brakes.

The spring 169 is so designed as to be ineffective to shift the piston 167 away from the stop shoulder 176 unless the brake pipe pressure is reduced an amount which is greater than the maximum reduction for service applications of the brakes. When a brake pipe reduction greater than the maximum reduction for a full service application of the brakes occurs, as in the manner to be hereinafter described for emergency applications of the brakes, the spring 169 shifts the piston 167 against the resisting force of the spring 154 in the left-hand direction into contact with a stop element, such as the cover plate 178 closing the open end of the chamber 168, thereby causing the stop flange 175 to be correspondingly shifted in the right-hand direction to increase the initial tension of spring 154.

It will thus be seen that the lever 172 may be made any desired length and may be pivoted on the pin 173 at such a point intermediate the ends thereof as to cause a predetermined increase in the initial tension of the spring 154 so as to vary the ranges A, B and C of rates of retardation. For example, upon an emergency application of the brakes, the tension of the spring 154 may be so increased as to cause range A to cover from zero to three miles per hour per second, range B to cover from three to four and one-half miles per hour per second, and range C to cover rates of retardation in excess of four and one-half miles per hour per second.

(d).—*Automatic valve device 14*

The automatic valve device 14 is of conventional design and is representative of any of the familiar standard types of automatic valve devices, such as the well known triple valve device, which is effective in response to a reduction in pressure in the brake pipe 24 at a service rate or at an emergency rate, to supply fluid under pressure from the auxiliary reservoir 21 to a pipe 181 leading to one side of the double check valve device 18 and which is effective upon an increase in brake pipe pressure to release fluid under pressure from the pipe 181 and to effect charging of the auxiliary reservoir 21 from the brake pipe 24.

(e).—*Brake valve 15*

While the brake valve device 15 may be of any conventional design, it is illustrated as, and I prefer to employ, the type of brake valve device described and claimed in the copending application, Serial No. 105,659, of Ellis E. Hewitt, filed October 15, 1936 and assigned to the same assignee as is the present application. For purposes of the present application it is necessary to understand that the handle 183 of the brake valve device 15 is operative over the same zone or range of movement to effect straight-air applications of the brakes or automatic applications of the brakes, dependent upon whether a manually operative selector element 184 is positioned in a straight-air application position or an automatic application position.

With the selector element 184 in straight-air position, the shifting of the operating handle 183 of the brake valve device 15 from its normal release position into the application zone, causes fluid under pressure to be supplied from the feed valve pipe 20 to a pipe 185 leading to the side of the double check valve 18 opposite to that to which the pipe 181 from the automatic valve device 14 is connected. The brake valve device 15 includes a self-lapping valve mechanism effective for straight-air operation, and thus the pressure attained in the pipe 185 is in proportion to the degree of movement of the operating handle 183 out of its normal release position. The construction of the brake valve device 15 is such that when the handle 183 reaches the full service position thereof, a maximum pressure is attained in the pipe 185. Thus even though the operating handle 183 is shifted beyond the full service position to an emergency position, no further increase in the pressure occurs in the pipe 185 beyond the maximum pressure for a full service application of the brakes.

With the operating handle 183 of the brake valve device 15 in its normal release position, whether the selector element 184 is in the straight-air position or automatic position, the pipe 185 is vented to atmosphere and the brake pipe 24 is charged with fluid under pressure from the feed valve pipe 20. For straight-air operations of the brake valve 15, the brake pipe 24 remains charged through the brake valve device from the feed valve pipe 20.

With the selector element 184 of the brake valve in the automatic position thereof, the operating handle 183 is operative in well known manner as for an automatic brake valve device to effect reduction in the brake pipe pressure at a service rate and to a desired degree.

With the selector element 184 in automatic position, operation of the handle 183 to emergency position effects a reduction in brake pipe pressure at an emergency rate and at the same time causes fluid under pressure to be supplied from the feed valve pipe 20 to the pipe 185 to the maximum degree of pressure, that is to the degree of pressure corresponding to a full service application of the brakes.

As previously mentioned, the pipes 185 and 181 are connected to opposite ends of the double check valve device 18. The double check valve device 18 is of standard construction and includes a shiftable piston valve which is subject on one end to the pressure in pipe 181 and at the opposite end to the pressure in pipe 185 and which controls communication from the pipes 185 and 181 to the straight-air pipe 23. When the pressure supplied through pipe 185 is higher than the pressure in the pipe 181 the piston valve is shifted to a position to cause fluid under pressure to be supplied from the pipe 185 to the straight-air pipe 23, and at the same time to close off the connection from the pipe 181 to the straight-air pipe. When the pressure in the pipe 181 exceeds the pressure in the pipe 185, the piston valve is shifted to a position in which it establishes communication through which fluid under pressure flows from the pipe 181 to the straight-air pipe 23, and at the same time cuts off the connection from the pipe 185 to the straight-air pipe 23.

As will be hereinafter explained in greater detail, the maximum pressure in the pipe 181 for emergency applications of the brakes exceeds the maximum pressure established in the pipe 185 for straight-air applications and thus the double check valve 18 is conditioned to cause fluid under pressure to be supplied from the auxiliary reservoir 21 to the straight-air pipe 23, the pressure in the pipe 185 being, however, potentially effective in the event of the reduction in pressure in the pipe 181 to condition the double check valve device 18 to cause fluid under pressure to be supplied from the pipe 185 to the straight-air pipe 23.

The feed valve device 16 is of standard construction and functions in its usual capacity to regulate the pressure of the fluid supplied from the main reservoir 19 into the feed valve pipe 20 to a pressure which is a substantially constant amount lower than the pressure in the main reservoir 19.

(f).—*Additional equipment and control circuits*

The electrical relays 26, 27 and 28 are of any suitable standard construction comprising an electromagnet winding, an associated magnetic core and an armature actuated upon energization of the electromagnet. The relay 26 is illustrated diagrammatically as comprising an electromagnet 191, a pair of contact members 192 and 193, hereinafter called the front contact members of the relay, and a contact member 194, hereinafter called the back contact member of the relay. When the electromagnet 191 is deenergized, the front contact members 192 and 193 are biased to a circuit-opening position and the contact member 194 to a circuit-closing position by a spring, not shown, or by gravity. When the electromagnet 191 is energized, the front contact members 192 and 193 are actuated to circuit-closing position and the back contact member 194 is actuated to circuit-opening position.

In a similar manner the relay 27 comprises an electromagnet 195 and two front contact members 196 and 197, and the relay 28 comprises an electromagnet 198, a front contact member 199 and a back contact member 200. As in the case of the relay 26, when the electromagnets of the relays 27 and 28 are deenergized the front contact members are in circuit-opening position while the back contact members are in circuit-closing position. Also, when the electromagnets of the relays 27 and 28 are energized, the front contact members are actuated to circuit-closing position and the back contact members are actuated to circuit-opening position.

The fluid-pressure-operated switch device 17 is of any suitable construction and may comprise a casing containing a piston 202 subject on one side to fluid pressure in a chamber 203 connected through a branch pipe 204 to the straight-air pipe 23. When the pressure of the fluid supplied to the straight-air pipe 23 and acting in the chamber 203 on the one side of the piston 203 exceeds a predetermined low pressure, such as one or two pounds per square inch, the piston 202 is shifted against the force of a spring 205 which yieldingly opposes movement of the piston. The piston 202 is effective, when shifted by the force of fluid under pressure supplied to the chamber 203, to move a contact-bridging member 206, carried for example in insulated relation on a stem 207 of the piston, into circuit-closing contact with a pair of resilient insulated contact fingers 208.

One of the contact fingers 208 of the switch device 17 is connected by wire 209 to one terminal of a source of current, indicated as the battery 34, the other contact finger 208 being connected by a branch wire 210 to a wire 211 hereinafter termed the battery wire, which is connected to one of the contact fingers 137 of the governor switch device 12. The other contact finger 137 of the governor switch device 12 is connected by a wire 212 to one terminal of the electromagnet 191 of the governor relay 26, the other terminal of the electromagnet 191 being connected to the opposite terminal of the battery 34 through a ground connection as shown or, if desired, through a return wire. It will thus be apparent that with the governor switch device 12 in circuit-closing position and the pressure switch 17 in circuit-closing position, the circuit is established for energizing the governor relay 26.

The contact finger 162 of the retardation controller 13 is connected by a wire 214, which is flexible at least in part, to the wire 211 and, thus, with the pressure switch 17 in circuit-closing position, one terminal of the battery 34 is connected to the contact finger 162.

One terminal of the electromagnet 195 of the relay 27 is connected by a wire 215 to the contact segment 163, the opposite terminal of the electromagnet 195 being connected by a wire 216 to ground and thus, through ground, to the opposite terminal of the battery 34. Thus, with the contact finger 162 in engagement with the contact segment 163 and with the pressure switch 17 in circuit-closing position, the circuit is completed for energizing the electromagnet of the relay 27.

One terminal of the electromagnet 198 of the relay 28 is connected by a wire 217 to the contact segment 164 of the retardation controller 13, the other terminal being connected by a branch wire 218 to the wire 216 which is connected to ground. Thus, when the contact finger 162 of the retardation controller engages the contact segment 164 and the pressure switch 17 is in circuit-closing position, a circuit is completed for energizing the electromagnet of the relay 28.

Corresponding terminals of the electromagnets 108, 118 and 128 of the magnet valve portion of the speed-controlled valve device 11 are connected to high speed wire 31, intermediate speed wire 32 and low speed wire 33, respectively, by wires 221, 222 and 223 respectively, the opposite corresponding terminals of the electromagnets 108, 118 and 128 being connected to the grounded terminal of the battery 34 through a ground connection at 225.

The relays 26, 27 and 28 function in cooperative relation to establish an electrical connection from the wire 211 to one or more of the wires 31, 32 and 33 in the manner to be hereinafter described in detail.

OPERATION OF EQUIPMENT SHOWN IN FIGURE 1

(a).—Running condition

With the car or train running under power or coasting, with the handle 183 of the brake valve device 15 in the release position thereof, with the selector element 184 in either straight-air or automatic position, and with the main reservoir 19 fully charged with fluid under pressure in the usual manner from a fluid compressor, not shown, fluid under pressure is supplied to the main reservoir pipe 22 and to the feed valve pipe 20. The chamber 46 containing the supply valve 41 of the speed-controlled valve device 11 is accordingly charged with fluid under pressure at main reservoir pressure from the main reservoir pipe through the branch pipe 47. With the handle 183 of the brake valve device 15 in release position, as assumed, fluid under pressure is supplied from the feed valve pipe 20 through the brake valve device 15 to the brake pipe 24 which is accordingly charged with fluid under pressure as regulated by the feed valve 16.

From the brake pipe 24 fluid under pressure will flow through a branch pipe 24a to the automatic valve device 14 and to the chamber 168 of the retardation controller device 13. The automatic valve device 14 is accordingly conditioned to establish communication through which the auxiliary reservoir 21 is charged to feed valve pressure from the brake pipe 24 and branch pipe 24a and a communication through which the pipe 181 leading to the double check valve device 18 is simultaneously vented to atmosphere.

Brake pipe pressure acting in chamber 168 overcomes the tension of the spring 169 and accordingly positions the stop flange 175 in the position as shown so that the spring 154 of the retardation controller device 13 is initially tensioned the required amount for service applications of the brakes.

As will be made apparent hereinafter the supply valve 41 and the release valve 42 of the speed-controlled valve device 11 are in seated and unseated positions, respectively, and thus the brake cylinder 10 is vented to atmosphere by way of the passage 52, chamber 51, past the unseated release valve 42, bore 56 and exhaust port 57, so that the brakes operated by the brake cylinder 10 are released.

In order to facilitate the understanding of the operation of the brake equipments, specific illustrative fluid pressures may be assumed. For example, it will be assumed that the main reservoir 19 is maintained charged to a pressure of one hundred and twenty-five pounds per square inch, that the feed valve 16 regulates the pressure supplied to the feed valve pipe 20 and thus the pressure in the brake pipe 24 to a pressure of one hundred and ten pounds per square inch, and that the maximum pressure established in the pipe 185 and straight-air pipe 23 when the brake valve device 15 is operated to effect application of the brakes by straight-air operation is seventy-five pounds per square inch. It will also be assumed that the maximum pressure established in the straight-air pipe 23 for automatic service applications of the brakes is seventy-five pounds per square inch and that the maximum pressure established in the straight-air pipe 23 for emergency applications of the brakes, that is the pressure of equalization between the auxiliary reservoir 21 and the straight-air pipe 23, is one hundred pounds per square inch.

(b).—Straight-air applications of the brakes initiated at train speeds in excess of forty miles per hour Assuming that the equipment is charged with fluid under pressure in the manner just described, and that the car or train is traveling at a speed of one hundred miles per hour so that the governor switch device 12 is in circuit-closing position, and assuming further that the selector element 184 of the brake valve device 15 is in the straight-air position thereof, the operator may initiate a straight-air application of the brakes by shifting the operating handle 183 of the brake valve device 15 in a horizontal plane out of its normal release position, a desired degree into the application zone. As previously indicated, the brake pipe 24 remains fully charged to feed valve pressure through the brake valve in such case and fluid under pressure is at the same time supplied from the feed valve pipe 20 to the pipe 185, such pressure shifting the piston valve of the double check valve device 18 to establish communication from the pipe 185 to the straight-air pipe 23 whereby fluid under pressure is supplied to the straight-air pipe 23 to a degree determined according to the position of the operating handle 183 of the brake valve device 15 in the application zone.

When the pressure in the straight-air pipe 23 exceeds the relatively low pressure of one or two pounds per square inch, the fluid-pressure-operated switch device 17 is actuated to circuit-closing position to effect energization of governor relay 26 and relay 27 in the manner previously indicated. Fluid under pressure from the straight-air pipe 23 is supplied through the branch pipe and passage 23a to the chamber 96 at the right-hand side of the smallest diaphragm 76 of the speed-controlled valve device 11 as well as to the chambers 109, 119 and 129 of the high speed magnet valve device 101, the intermediate speed magnet valve device 102 and the low speed magnet valve device 103, respectively.

Energization of the relays 26 and 27 and the consequent actuation thereof in the manner previously described, establishes circuits for energizing the electromagnet 108 of the high speed magnet valve device 101 and the electromagnet 118 of the intermediate speed magnet valve device 102 of the speed-controlled valve device 11. The circuit for energizing the electromagnet 108 extends from the non-grounded terminal of the battery 34, through switch device 17, wire 211, a branch wire 231, front contact member 196 of relay 27, now closed, a wire 232, front contact member 192 of the relay 26, high speed wire 31, branch wire 221, electromagnet 108 and thence to the grounded terminal of the battery 34 in the manner indicated. The circuit for energizing the electromagnet 118 extends in a similar manner from the battery 34 through the switch device 17, wires 211 and 231, and thence by way of a wire 234, back contact member 200 of the relay 28, a wire 235, front contact member 193 of the relay 26, intermediate speed train wire 32, branch wire 222, electromagnet 118 and thence to the grounded terminal of the battery 34 in the manner indicated.

The electromagnet 128 of the low speed magnet valve device 103 remains deenergized at this time for reasons which will be hereinafter made apparent.

It will now be seen that with the electromagnets 108 and 118 of the high speed and intermediate speed magnet valve devices 101 and 102, respectively, energized and with the electromagnet 128 of the low speed magnet valve device 103 deenergized, communications are respectively established by the magnet valve devices 101 and 102 and 103 for supplying fluid under pressure from the chambers 109, 119 and 129 respectively to the chambers 93, 94 and 95 between the diaphragms of the speed-controlled valve device 11.

With the diaphragm chambers 93, 94, 95 and 96 thus charged to the pressure in the straight-air pipe 23, it will be apparent that the fluid pressure forces on opposite sides of the diaphragms 74, 75 and 76 are balanced, the largest diaphragm 73 alone being subject to the unbalanced force of fluid under pressure acting in chamber 93 on the right-hand face thereof.

The diaphragm 73 is accordingly flexed individually, while the remaining diaphragms remain stationary, to exert a force on the rounded head portion 64 of the slidable member 43 of the valve portion of the speed-controlled valve device 11, which force is equal to the fluid pressure in pounds per square inch acting in the chamber 93 multiplied by the effective area in square inches of the diaphragm 73. The slidable member 43 is accordingly shifted in the left-hand direction against the opposing force of the spring 62 to operate to first seat the release valve 42 and then unseat the supply valve 41, in the manner previously described. Fluid under pressure is accordingly supplied from the main reservoir 19 and main reservoir pipe 22 through the branch pipe 47, chamber 46, past the unseated supply valve 41, chamber 51 and passage 52 to the brake cylinder 10 to effect an application of the brakes.

When the pressure of the fluid acting in the chamber 51 and thus on the left-hand face of the follower plate 78 associated with the diaphragm 73 approaches a degree substantially equivalent to the pressure in the chamber 93, the spring 62 becomes effective to return the slidable member 43 in the right-hand direction so that when the pressure in the brake cylinder 10 is substantially equivalent to the pressure in the chamber 93 and thus substantially equivalent to the pressure in the straight-air pipe 23, the supply valve 41 is reseated while the release valve 42 is maintained seated at the same time so that pressure in the brake cylinder 10 is limited to and maintained substantially at the pressure in the straight-air pipe 23.

In the event of leakage past the release valve 42 or in the event of reduction in the pressure in the brake cylinder 10 and accordingly in the chamber 51 for any other reason, the higher unbalanced pressure in the chamber 93 again becomes effective to cause unseating of the supply valve 41 to replenish the supply of fluid under pressure to the brake cylinder from the main reservoir and main reservoir pipe 22 to maintain the pressure in the brake cylinder at a value or a degree substantially equivalent to the pressure in the chamber 93 and thus in the straight-air pipe 23.

It will be apparent that the degree of pressure attained in the brake cylinder 10 depends upon the degree of pressure established in the straight-air pipe 23 by the brake valve device 15. Obviously, if the handle 183 of the brake valve device 15 is initially shifted to a greater extent out of its release position into the application zone or if, after shifting the handle a certain degree into the application zone, it is shifted a further degree into the application zone, the increased pressure in the diaphragm chamber 93 again causes unseating of the supply valve 41 to further increase the pressure in the brake cylinder 10, the supply of fluid under pressure to the brake cylinder 10 being cut off or lapped automatically in the manner previously described when the pressure in the brake cylinder 10 attains a degree substantially equivalent to the pressure in the chamber 93. It will be apparent that the maximum ratio of brake cylinder pressure to the pressure established in straight-air pipe 23 attainable under straight-air operation is thus a one-to-one ratio and accordingly the maximum brake cylinder pressure which may be established is substantially the maximum pressure which may be established in the straight-air pipe 23 by operation of the brake valve 15, which as has been assumed is seventy-five pounds per square inch.

Assuming that the maximum degree of pressure has been established in the brake cylinder in the manner just described, the retardation controller 13 is responsive to the rate of retardation produced on the car or train to further control the brake cylinder pressure in the manner to be presently described.

For purposes of the present explanation it must be borne in mind that the governor switch device 12 remains in circuit-closing position, in accordance with the assumption originally made that the car or train is traveling at a rate of speed in excess of forty miles per hour, and that accordingly the governor relay 26 remains energized.

As the train speed reduces from the initial high speed, contact finger 162 of the retardation controller 13 is gradually shifted in a counterclockwise direction in accordance with the increase in the rate of retardation. When the contact finger 162 disengages the contact segment 163, having traversed the range A of retardation rates, and enters the range B of retardation rates, the circuit, previously traced, through which the relay 27 is energized is interrupted and consequently the relay 27 is deenergized. Contact members 196 and 197 of the relay 27 are thus shifted to circuit-opening position and as a result of the opening of the contact member 196, the circuit previously traced for energizing the electromagnet 108 of the high speed magnet valve device 101 is interrupted and the electromagnet 108 is deenergized. Since the relay 28 remains deenergized in the range B of retardation rates, the circuit for energizing the electromagnet 118 of the intermediate speed magnet 102 remains closed through the back contact member 200 of the relay 28 and the front contact member 193 of the governor relay 26. The electromagnet 128 of the low speed magnet valve device 103 remains deenergized at this time as will appear more clearly from subsequent description.

It will be seen therefore that, as a result of the deenergization of the electromagnet 108 of the high speed magnet valve device 101, chamber 93 between the diaphragms 73 and 74 is vented to atmosphere past the unseated release valve 106 and through the restricted passage 112 while the chambers 94, 95 and 96 in the diaphragm portion of the speed-controlled valve device 11 remain charged with fluid under pressure.

The restricted passage 112 may be of any desired cross-sectional area and is for the purpose of so restricting the rate of reduction of the pressure of the fluid in the chamber 93 as to prevent a sudden change in brake cylinder pressure 10 and the possible resultant shock and jar to the cars of the train particularly when of the non-articulated type.

When the fluid under pressure in the chamber 93 has been completely vented to atmosphere, the pressure in the brake cylinder 10 is determined according to the force urging the slidable member 43 of the valve portion of the speed controlled valve device 11 in the left-hand direction which force is equal to the pressure of the fluid in the chamber 94 in pounds per square inch multiplied by the effective area of the diaphragm 74 in square inches.

It will be apparent that the relative effective pressure areas of the diaphragms 73, 74, 75 and 76 may be proportioned as desired. However, in order to more readily understand the operation of the equipment, let it be assumed that the effective pressure areas of the diaphragm 73, 74, 75 and 76 may be expressed as twelve, nine, six and four units of area, such as square inches, respectively.

Since the effective pressure area of the diaphragm 73 is larger than the effective pressure area of the diaphragm 74 it will be apparent that, with the chamber 93 vented to atmosphere, the force of the brake cylinder pressure acting on the left-hand face of the follower disc 78 associated with the large diaphragm 73 and which corresponds in area to the effective pressure area of the diaphragm 73 is greater than the force of the pressure in the chamber 94 acting on the right-hand face of the diaphragm 74. As a result, the spring 62 becomes effective to shift the slidable member 43 in the right-hand direction so as to cause a release of fluid under pressure from the brake cylinder 10. Fluid under pressure is released from the brake cylinder 10 past the unseated release valve 42 and through the exhaust port 57 until the force of the fluid pressure in the chamber 94 urging the slidable member 43 in the left-hand direction slightly exceeds the force of the pressure acting on the diaphragm 73 urging the diaphragm in the right-hand direction. The slidable member 43 is thus shifted by the slightly unbalanced fluid pressure force, in the left-hand direction to effect reseating of the release valve 42 to cut off the further release of fluid under pressure from the brake cylinder 10. When this occurs, the brake cylinder pressure acting in the chamber 51 substantially balances the pressure in the chamber 94 and thus the supply valve 41 is not unseated and the release valve 42 is maintained seated.

In view of the difference in the effective pressure areas of the diaphragms 73 and 74 it will be apparent that the reduced pressure in the brake cylinder 10 effected as a result of the venting of the chamber 93 will be in proportion to the pressure of the fluid in the chamber 94 as the effective pressure area of the diaphragm 74 is to the effective pressure area of the diaphragm 73. On the basis of the assumed effective pressure areas of the diaphragms 73 and 74 and a fluid pressure of seventy-five pounds per square inch in the chamber 94, the pressure in the brake cylinder is reduced to nine-twelfths, that is three-fourths, of seventy-five pounds per square inch or approximately fifty-six pounds per square inch.

Now let it be assumed that although brake cylinder pressure is reduced in the manner just described, as the speed of travel of the train further reduces, the rate of retardation of the train increases to such an extent that the contact finger 162 of the retardation controller 13 passes out of the range B of retardation rates and into the range C wherein the contact finger 162 engages the contact segment 164.

The engagement of the contact finger 162 of the retardation controller 13 with the contact segment 164 establishes a circuit for energizing the electromagnet 198 of the relay 28 in the manner previously described and the back contact member 200 and the front contact member 199 of the relay 28 are accordingly actuated to circuit-opening and circuit-closing positions, respectively. As will be understood from subsequent description, the actuation of the front contact member 199 of the relay 28 to circuit-closing position is without effect at this time. The actuation of the back contact member 200 of the relay 28 to circuit-opening position, however, interrupts the circuit, previously traced, whereby the electromagnet 118 of the intermediate speed magnet valve device 102 of the speed-controlled valve device 11 is energized and, consequently, the electromagnet 118 is deenergized. The consequent seating of the supply valve 115 of the intermediate speed magnet valve device 102 cuts off communication through which fluid under pressure is supplied to the chamber 94 between the diaphragms 74 and 75 of the speed-controlled valve device 11 and the unseating of the release valve 116 establishes communication through which fluid under pressure is released from the chamber 94 past the unseated release valve 116 and through the restricted passage 122. The restricted passage 122 performs the same function with respect to limiting the rate of reduction of the pressure in the chamber 94 as performed by the restricted passage 112 for the chamber 93.

Assuming, therefore, that after a short interval of time determined by the size of the restricted passage 122, fluid under pressure is completely vented to atmosphere from the chamber 94, it will again appear that the brake cylinder pressure 10 acting in the chamber 51 on the left-hand face of the follower disc 78 associated with the largest diaphragm 73 overbalances the opposing force exerted by fluid under pressure in the chamber 95 acting on the right-hand face of the diaphragm 75. Accordingly, the spring 62 again becomes effective to shift the slidable member 43 to cause unseating of the release valve 42 and effect a further release of fluid under pressure from the brake cylinder 10. As in the previously described instance, when the total force of the fluid pressure acting in chamber 95 on the diaphragm 75 and urging the slidable member 43 in the left-hand direction exceeds the force of the brake cylinder pressure acting in the chamber 51 on the left-hand face of the follower 78 associated with the diaphragm 73, the release valve 42 is reseated to cut off the further exhaust of fluid under pressure from the brake cylinder 10. The pressure in the brake cylinder is reduced, in this instance, to the same ratio to the pressure of the fluid in the chamber 95, and accordingly in the straight-air pipe 23, as the effective area of the diaphragm 75 bears to the effective area of the diaphragm 73. If the effective pressure area of the diaphragm 75 is one-half of the effective pressure area of the diaphragm 73, the effective pressure areas of the diaphragms 73 and 75 being previously assumed of twelve and six units of area, respectively, thus it will be clear that the pressure in the brake cylinder is reduced to one-half of the fluid pressure in the chamber 95 and in the straight-air pipe 23. Assuming a maximum straight-air pipe pressure of seventy-five pounds per square inch, the pressure in brake cylinder is reduced to one-half of seventy-five pounds per square inch or approximately thirty-seven and one-half pounds per square inch.

If the pressure established in the straight-air pipe 23 is less than the full or maximum pressure of seventy-five pounds per square inch assumed, it will be apparent that the pressure established in the brake cylinder 10 for the various ranges A, B and C of rates of retardation will be in corresponding relation or proportion to the illustrative pressures indicated.

It will be apparent that the operator may forestall automatic reduction in brake cylinder pressure due to operation of the retardation controller 13, by operating the handle 183 of the brake valve device 15 to reduce the pressure in the straight-air pipe 23 from the established value, as the speed of the car or train reduces. When the pressure in the straight-air pipe 23 is thus reduced from a higher to a lower pressure, the pressure in any of the chambers 93, 94 and 95 which is charged with fluid under pressure, is correspondingly and rapidly reduced according to the reduction in pressure in the straight-air pipe 23 by flow of fluid under pressure past the check valves 93a, 94a and 95a, respectively. The chamber 96, being directly connected to the straight-air pipe 23 through the passage 23a, obviously reduces in pressure according to the reduction in straight-air pipe pressure independently of the check valves 93a, 94a and 95a. Assuming all of the chambers 93, 94, 95 and 96 to be charged with fluid under pressure from the straight-air pipe 23, a reduction in the control pressure of the fluid in the straight-air pipe 23 will obviously result in a corresponding reduction in brake cylinder pressure, in a manner similar to that for a reduction of the pressure of the fluid in the chamber 93 by deenergization of the high speed magnet valve device 101.

Summarizing briefly, therefore, a straight-air application of the brakes initiated while the car or train is traveling in excess of forty miles per hour, it will be seen that a maximum brake cylinder pressure is initially established which is substantially equivalent or in one-to-one ratio to the pressure established in the straight-air pipe 23 and that the retardation controller 13 thereafter functions automatically as the rate of retardation of the car or train increases from range A, to ranges B and C to effect operation of the speed-controlled valve device 11 to automatically reduce brake cylinder pressure to successively lower ratios to the pressure established in the straight-air pipe 23. Representing the brake cylinder pressure initially established as one hundred per cent, the brake cylinder pressure established when the car or train is retarded at a rate within the range B may be represented as seventy-five per cent. Similarly, when the rate of retardation of the car or train comes with range C, the brake cylinder pressure established may be represented as fifty per cent.

Let it now be assumed that while the car or train is retarded at a rate within the range C of the retardation controller and accordingly while the brake cylinder pressure is fifty per cent of the maximum pressure of seventy-five pounds per square inch in the straight-air pipe 23, the speed of the car or train reduces below forty miles per hour.

When the speed of the car or train reduces below the predetermined speed determined by the governor switch 12 and assumed to be, for example, forty miles per hour, the contact member 135 of the governor switch disengages the contact fingers 137 and thus interrupts the circuit previously described for energizing the governor relay 26. Keeping in mind the fact that with the contact finger 162 of the retardation controller 13 in engagement with the contact segment 164 the relay 28 is energized or picked up, the deenergization of the relay 26 and the consequent actuation of the back contact member 194 to circuit-closing position completes a circuit for energizing the electromagnet 128 of the low speed magnet valve device 103 of the speed controlled valve device 11, the circuit extending from the non-grounded terminal of the battery 34 through the contact members of the pressure switch 17, wires 210 and 211, contact member 194 of the governor relay 26, the wire 241, a branch wire 242, contact member 199 of the relay 28, low speed train wire 33, branch wire 223, electromagnet 128, and through the ground connection at 225 to the grounded terminal of the battery 34.

As previously described, the double beat valve 125 of the low speed magnet valve device 103 is shifted to its lower seated position upon energization of the electromagnet 128 and thus the supply of fluid under pressure from the straight-air pipe 23 to the chamber 95 between the diaphragms 75 and 76 is cut off and, simultaneously, fluid under pressure is released from the chamber 95 past the open upper seat of the double beat valve 125 through passage 131 and restricted passage 132. The restricted passage 132 serves to restrict the rate of reduction of the fluid under pressure in the chamber 95 in the same manner as do the restricted passages 112 and 122 for their corresponding diaphragm chambers.

Keeping in mind that the chambers 93 and 94 have been previously vented to atmosphere in the manner described, the complete venting of fluid under pressure from the chamber 95 causes the higher unbalanced force exerted by the brake cylinder pressure in chamber 51 acting on the left-hand face of the follower disc 78 associated with the largest diaphragm 73 to overcome the force of the fluid pressure in chamber 96 acting on the right-hand face of the smallest diaphragm 76, thereby permitting the spring 62 to shift the slidable member 43 of the valve portion of the speed-controlled valve device 11 to effect unseating of the release valve 42.

In a manner similar to that previously described, fluid under pressure is vented from the brake cylinder 10 through the exhaust port 57 until the force of the brake cylinder pressure acting in chamber 51 on the diaphragm 73 is substantially equivalent to the force exerted on the smallest diaphragm 76 by the pressure of the fluid in the chamber 96. The pressure in the brake cylinder is thus reduced to a pressure which bears the same relation to the pressure in the chamber 96, and thus in the straight-air pipe 23, as the effective area of the smallest diaphragm 76 bears to the effective area of the largest diaphragm 73. On the basis of twelve and four units of area as the effective pressure areas for the diaphragms 73 and 76, respectively, as previously assumed, it will thus be seen that the brake cylinder pressure will be one-third of the pressure established in the straight-air pipe 23. With a maximum straight-air pipe pressure of seventy-five pounds per square inch as assumed, it follows that a pressure of twenty-five pounds per square inch will be established in the brake cylinder 10.

Let it now be further assumed that due to the reduction in brake cylinder pressure as just described, the rate of retardation of the car or train decreases and that, consequently, the contact finger 162 of the retardation controller 13 recedes toward its normal position into the range B of retardation rates, thereby disengaging the contact segment 164. The relay 28 is accordingly deenergized and the consequent shifting of the contact member 199 of the relay 28 to circuit-opening position effects interruption of the circuit for energizing the electromagnet 128 of the low speed magnet valve device 103.

The double beat valve 125 of the low speed magnet valve device 103 of the speed controlled valve device 11 is accordingly shifted to its upper seated position to close off the exhaust of fluid under pressure from the chamber 95 and fluid under pressure is again supplied from the straight-air pipe 23 to the chamber 95 past the open lower valve seat of the double beat valve 125. It will be apparent, therefore, that the resupply of fluid under pressure to the chamber 95 reestablishes the next highest ratio of brake cylinder pressure to straight-air pipe pressure according to the relation of the effective pressure area of the diaphragm 75 to the area of the diaphragm 73, which as previously assumed, is in the ratio of one-to-two. Assuming that the maximum straight-air pipe pressure of seventy-five pounds per square inch is maintained, the pressure in the brake cylinder will be increased to one-half of seventy-five pounds per square inch or approximately thirty-seven and one-half pounds per square inch.

If the reduction in brake cylinder pressure effected due to the opening of the contact members of the governor switch device 12 so reduces the rate of retardation of the car or train that the contact finger 162 of the retardation controller 13 continues in its recessional movement through the range B into the range A wherein the contact finger 162 reengages the contact segment 163, brake cylinder pressure is further increased in the following manner to the next highest ratio to straight-air pipe pressure.

Upon the reengagement of the contact finger 162 with the contact segment 163, relay 27 is again energized or picked up and the consequent shifting of the front contact member 197 of the relay 27 to circuit-closing position completes the circuit for energizing the electromagnet 118 of the intermediate speed magnet valve device 102. This circuit extends from the non-grounded terminal of the battery 34 through the contact members of the pressure switch 17, wires 210 and 211, back contact member 194 of the governor relay 26, wire 241, front contact member 197 of the relay 27, a wire 245, intermediate speed train wire 32, branch wire 222, electromagnet 118 and through the ground connection at 225 to the grounded terminal of the battery 34.

As a result, fluid under pressure is resupplied from the straight-air pipe 23 past the unseated supply valve 115 of the intermediate speed magnet valve device 102 to the chamber 94 between the diaphragms 74 and 75.

As in the previous instance, with the chambers 94, 95 and 96 charged with fluid under pressure, the pressure now established in the brake cylinder 10 is determined by the relation of the effective pressure area of the diaphragm 74 to the effective pressure area of the diaphragm 73. On the basis of the assumed ratio of areas of the diaphragms 73 and 74 of four to three, it will be apparent that the pressure in the brake cylinder will be increased to three-fourths of the pressure established in the straight-air pipe 23. If the maximum straight-air pipe pressure of seventy-five pounds per square inch is maintained, the pressure now established in the brake cylinder 10 will be three-fourths of seventy-five pounds per square inch or approximately fifty-six pounds per square inch.

If as the speed of the car or train reduces and a complete stop is approached, the rate of retardation of the car or train again increases it will be apparent that the brake cylinder pressure will be reduced to lower ratio with the straight-air pipe pressure depending upon whether the contact finger 162 of the retardation controller is within the range B or the range C. If the contact finger 162 is within the range B of retardation rates, the pressure established in the brake cylinder will be one-half of the straight-air pipe pressure, and if the contact finger 162 enters the range C of retardation rates, brake cylinder pressure will be reduced to one-third of the straight-air pipe pressure.

When the car or train is brought to a complete stop, the contact finger 162 automatically returns to its normal position in engagement with the contact finger 163. The pressure established in the brake cylinder to hold the car or train at a standstill will thus be determined by the ratio of the areas of the diaphragms 74 and 73, that is it will be three-fourths of the pressure in the straight-air pipe. Assuming that the maximum straight-air pipe pressure of seventy-five pounds per square inch is maintained, it will thus be seen that an effective brake cylinder pressure of approximately fifty-six pounds per square inch is effective to hold the car or train at a standstill.

(c).—*Straight air applications of the brakes initiated at train speeds below forty miles per hour*

If a straight-air application of the brakes is initiated when the car or train is traveling at a speed below forty miles per hour, the maximum initial brake cylinder pressure which can be established is determined by the relation of the areas of the diaphragms 74 and 73. Assuming that a maximum pressure of seventy-five pounds per square inch is established in the straight-air pipe, this means that a maximum brake cylinder pressure of three-fourths of seventy-five pounds per square inch, or approximately fifty-six pounds per square inch is established in the brake cylinder 10.

The reason for such automatic limitation of the initial brake cylinder pressure for brake applications initiated at train speeds below forty miles per hour will be readily understood from the foregoing description wherein the operation of the equipment to establish such brake cylinder pressure has been described for the condition in which the governor relay 26 and the relay 28 are deenergized and only the relay 27 is energized.

As in the previously described operation of the brake control equipment, at a train speed below forty miles per hour following deceleration of the car or train from a speed in excess of forty miles per hour, the retardation controller 13 functions to successively reduce the ratio of the brake cylinder pressure to the straight-air pipe pressure as the contact finger 162 successively enters ranges B and C of retardation rates.

(d).—*Release of the brakes*

When it is subsequently desired to again start the car or train, the brakes may be released by the operator returning the handle 183 of the brake valve device 15 to release position to cause the pressure in the straight-air pipe 23 to be reduced to atmospheric pressure.

The chamber 96 of the speed control valve device 11 being directly connected to the straight-air pipe 23 is, of course, thus vented to atmosphere through the branch pipe and passage 23a. The chambers 94 and 95, which it will be recalled are charged with fluid under pressure when the car or train is stopped, will be vented simultaneously by flow of fluid under pressure therefrom past the check valves 94a and 95a, respectively, and thence through the branch passage and pipe 23a. The chamber 93 between the largest diaphragm 73 and the adjacent diaphragm 74, it will be remembered, is already vented to atmosphere since the high speed magnet valve device 101 is deenergized at all times when the car or train is stopped. Spring 62 of the valve portion of the speed-controlled valve device 11 thus becomes effective to shift the slidable member 43 in the right-hand direction to effect unseating of the release valve 42 and thereby cause complete venting of fluid under pressure from the brake cylinder 10, the valve portion being ultimately restored to the position shown in Fig. 1.

(e).—*Automatic service applications of the brakes initiated at train speeds in excess of forty miles per hour*

Assuming that the car or train is traveling at a relatively high speed, such as one hundred miles per hour, which is in excess of the forty miles per hour as determined by the governor switch device 12, and with the selector element 184 of the brake valve device 15 in automatic position, an automatic service application of the brakes may be effected by the operator shifting the handle 183 of the brake valve device 15 in a horizontal plane in the usual manner for an automatic brake valve device to effect a desired reduction in brake pipe pressure in the pressure of the brake pipe 24, at a service rate.

The automatic valve device 14 operates in response to the reduction in brake pipe pressure at a service rate to establish a communication therethrough for the supply of fluid under pressure from the auxiliary reservoir 21 to the pipe 181.

Since the pipe 185 leading from the brake valve device 15 and through which fluid under pressure is supplied to the straight-air pipe 23 for straight-air applications of the brakes remains vented to atmosphere for automatic service applications of the brakes, it will be seen that the pressure of the fluid supplied into the pipe 181 shifts the piston valve of the double check valve 18 to cut off communication from the pipe 185 to the straight-air pipe 23 and to establish communication through which fluid under pressure is supplied from the pipe 181 to straight-air pipe 23.

Since the reduction in brake pipe pressure is at a service rate and since the amount of the reduction is insufficient, the piston 167 of the retardation controller is maintained in its right-hand position in contact with the stop shoulder 176 so that the retardation controller 13 remains effective to control the brakes in the same manner as previously described for straight air applications of the brakes.

As a result of the actuation of the contact members of the pressure switch 17 to circuit-closing position and the supply of fluid under pressure to the chambers 93, 94, 95 and 96 of the speed-controlled valve device 11, fluid under pressure is supplied to the brake cylinder 10 in exactly the same manner as previously described for straight-air applications of the brakes. Since all of the chambers 93, 94, 95 and 96 are charged with fluid under pressure initially, it follows that the initial pressure established in the brake cylinder 10 bears a one-to-one ratio to the pressure established in the straight-air pipe 23.

If the amount of the reduction in brake pipe pressure 24 effected by operation of brake valve device 15 is such as to produce a pressure of forty pounds in the straight-air pipe 23, the initial pressure established in the brake cylinder 10 will be forty pounds.

For purposes of the present description, let it be assumed that the maximum pressure of seventy-five pounds per square inch is established in the straight-air pipe in effecting an automatic service application of the brakes. In such case, the initial pressure established in the brake cylinder 10 will be substantially seventy-five pounds per square inch.

As the speed of the car or train reduces due to the application of the brakes, the retardation controller 13 is effective in the same manner as previously described for straight-air applications of the brakes to effect such control of the speed-controlled valve device 11 as to reduce the ratio between the brake cylinder pressure and the pressure established in the straight-air pipe 23, depending upon the rate of retardation of the car or train. Also in a similar manner to that described for straight-air applications of the brakes, a reduction in the ratio of brake cylinder pressure to the pressure established in the straight-air pipe 23 is effected when the speed of the car or train reduces below forty miles per hour.

When the car or train is brought to a complete stop, the final brake cylinder pressure maintained is determined according to the ratio of the effective areas of the diaphragms 74 and 73 in the same manner as previously described in the case of a train or car being brought to a stop following a straight-air application of the brakes.

(f).—*Automatic service applications of the brakes initiated at train speeds below forty miles per hour*

In the event that an automatic service application of the brakes is initiated at a time that the car or train is traveling at a speed below forty miles per hour, the maximum initial ratio of brake cylinder pressure to the pressure established in the straight-air pipe 23 is limited to the ratio of the area of the diaphragm 74 to the area of the diaphragm 73 in the same manner as for straight-air applications of the brakes initiated as train speeds below forty miles per hour. Upon an increase in the rate of retardation of the car or train following the initiation of an automatic service application of the brakes at train speeds below forty miles per hour, the retardation controller 13 functions to reduce or control the pressure in the brake cylinder 10 in the same manner as for straight-air applications of the brakes.

The final brake cylinder pressure established, assuming that the same pressure is established in the straight air pipe 23 when the car or train is brought to a complete stop as in the case of the car or train brought to a stop from a speed in excess of forty miles per hour, is in the same ratio to the pressure in straight-air pipe 23 as the ratio of the areas of the diaphragms 74 and 73, that is, on the basis of the illustrative figures used, three-fourths of the pressure in the straight-air pipe 23.

(g).—*Release of the brakes following automatic service applications of the brakes*

In order to release the brakes following automatic service applications of the brakes effected in the manner just described, the operator merely returns the operating handle 183 of the brake valve device 15 to release position to restore the normal feed valve pressure in the brake pipe 24. The automatic valve device 14 operates in response to the restoration of the normal pressure in the brake pipe 24 to effect recharging of the auxiliary reservoir 21 to its normal fully charged condition and establishes a communication through which the straight-air pipe 23 and the pipe 181 is vented to atmosphere.

In the same manner as previously described for the release of the brakes following a straight-air application of the brakes, upon the complete venting of fluid under pressure from the chambers 94, 95, and 96 of the speed-controlled valve device 11, the valve portion of the speed controlled valve device is restored to the position shown wherein the supply valve 41 is seated and the release valve 42 is unseated to effect complete exhaust of fluid under pressure from the brake cylinder 10, which results in a complete release of the brakes.

(h).—*Automatic emergency applications of the brakes initiated at train speeds in excess of forty miles per hour*

Assuming that the car or train is traveling at a speed, such as one hundred miles per hour, with the selector element 184 of the brake valve device 15 in automatic position, an automatic emergency application of the brakes is effected by the operator shifting the handle 183 of the brake valve device 15 to emergency position.

In such case the brake valve is adapted to effect an emergency reduction in the pressure in the brake pipe 24 which exceeds both in rate and amount, that of a service reduction.

The automatic valve device 14 operates in response to the emergency reduction of brake pipe pressure to effect the supply of fluid under pressure from the auxiliary reservoir 21 to the straight-air pipe 23, the amount of the reduction in brake pipe pressure being such as to cause full equalization of the pressure in the auxiliary reservoir 21 and in the straight-air pipe 23, which as previously assumed may be one hundred pounds per square inch.

In the emergency position of the handle 183 of the brake valve device 15, fluid under pressure is also supplied to the pipe 185. However, since the pressure in the pipe 181 acting on one side of the piston valve of the double check valve 18 is a maximum pressure of one hundred pounds and the maximum pressure acting on the opposite side of the piston valve in the pipe 185 is only seventy-five pounds, it follows that the pressure in pipe 181 predominates and thus that communication from the pipe 181 to the straight-air pipe 23 is established, the pressure in the pipe 185 being, however, potentially effective in the event of failure of the automatic valve device to properly supply fluid under pressure to the straight-air pipe 23 or in the event of undesired reduction in the pressure in the straight-air pipe, as by leakage, to supply fluid under pressure to the straight-air pipe 23 and insure application of the brakes.

In view of the fact that the brake pipe pressure acting in the chamber 168 of the retardation controller 13 is sufficiently reduced, in the case of an emergency reduction in brake pipe pressure, to permit the spring 169 to shift the piston 167 in the left-hand direction into contact with the cover plate 178, the spring 154 of the retardation controller is initially tensioned an increased amount in the manner previously described, so that the ranges A, B, and C of rates of retardation are varied accordingly.

Upon the supply of fluid under pressure to the straight-air pipe in the manner just described, the speed-controlled valve device 11 functions, in exactly the same manner as previously described for straight-air applications of the brakes initiated at train speeds in excess of forty miles per hour, to establish a substantially one-to-one ratio between the brake cylinder pressure and the pressure in the straight-air pipe 23.

It will be understood, however, that since the assumed maximum pressure established in the straight-air pipe 23 for automatic emergency applications of the brakes is one hundred pounds per square inch, whereas the maximum pressure established in the straight-air pipe 23 either for a straight-air application or for an automatic service application of the brakes is seventy-five pounds per square inch, the braking force produced or effective initially for an automatic emergency application of the brakes is considerably greater than the initial braking force effected for either a straight-air application or an automatic service application of the brakes. On the basis of the assumed pressures established in the straight-air pipe, the maximum initial pressure established in the brake cylinder for an automatic emergency application of the brakes is one hundred pounds per square inch, or about thirty-three per cent higher than the maximum initial braking force established for straight-air applications of the brakes and automatic service applications of the brakes.

The retardation controller 13 functions, in a manner similar to that previously described for straight-air applications of the brakes, to reduce the ratio of the brake cylinder pressure to the pressure established in the straight-air pipe as the rate of retardation of the car or train increases.

It will be understood, however, that the variations in the ratio of brake cylinder pressure to the pressure in the straight-air pipe 23 as effected under the control of the retardation controller 13 occur at different rates of retardation, that is higher rates of retardation than in the case of straight-air applications or automatic service applications of the brakes.

(i).—*Automatic emergency applications of the brakes initiated at train speeds below forty miles per hour*

In the event that an automatic emergency application of the brakes is initiated in the manner previously described, at a time that the train is traveling at a speed below forty miles per hour, the maximum ratio between the brake cylinder pressure and the pressure established in the straight-air pipe is determined by the ratio of the area of the diaphragm 74 to the area of the diaphragm 73 in exactly the same manner as for straight-air or automatic service applications of the brakes initiated at train speeds below forty miles per hour. On the basis of the assumed figures, that is the establishment of a pressure of one hundred pounds per square inch in the straight-air pipe and a ratio between the area of the diaphragm 74 to the diaphragm 73 of three to four, it follows that the maximum initial brake cylinder pressure established will be three-fourths of one hundred pounds per square inch, or seventy-five pounds per square inch.

As in the case of an automatic emergency application of the brakes initiated at train speeds in excess of forty miles per hour, the retardation controller 13 is effective to control the operation of the speed-controlled valve device 11, as the speed of the train diminishes, on the basis of the variation in the ranges A, B and C of rates of retardation as effected by the emergency reduction of fluid under pressure in the chamber 168 of the retardation controller.

When the car or train is stopped, and the contact finger 162 of the retardation controller returns into engagement with the contact segment 163, the ratio of brake cylinder pressure and straight-air pipe pressure is restored to a ratio as determined by the ratio of the areas of the diaphragm 74 to the diaphragm 73, in exactly the same manner as in the case of a car or train being at a stop following a straight-air or automatic service application of the brakes.

(j).—*Release of the brakes following an automatic emergency application of the brakes*

In order to effect the release of the brakes following an emergency application of the brakes, whether initiated at a train speed in excess of forty miles per hour or at a speed below forty miles per hour, the operator shifts the operating handle 183 of the brake valve device 15 to release position to effect restoration of the brake pipe pressure to its normal feed valve pressure. The automatic valve device 14 operates in response to the restoration of the brake pipe pressure to its normal feed valve pressure to effect the recharging of the auxiliary reservoir 21 to feed valve pressure and establishes communication through which fluid under pressure is vented from the straight-air pipe to atmosphere through the pipe 181. The brakes are thus released in the same manner as described in the case of release of the brakes following an automatic service application of the brakes.

EMBODIMENT SHOWN IN FIG. 2

Only so much of the embodiment shown in Fig. 2 is illustrated as is necessary to point out the difference in construction and operation from the equipment shown in Fig. 1. The various pipes and wires in the embodiment shown in Fig. 2 which correspond to those of the embodiment shown in Fig. 1 are correspondingly numbered.

Briefly, the embodiment shown in Fig. 2 differs from the embodiment shown in Fig. 1 in the provision of a governor switch device 12A which differs from the governor switch device 12 of the embodiment shown in Fig. 1 in having two circuit-closing contact members instead of one, and in the provision of two governor relays 261 and 262 in place of the single governor relay 26 as well as in the provision of two relays 270 and 280 in place of the relays 27 and 28, respectively.

The governor switch device 12A comprises a centrifuge portion similar to that described for the governor switch device 12, and a switch operating stem 266 corresponding to the stem 136 of the governor switch device 12 which stem 266 carries two insulated contact-bridging members 267 and 268 for respectively engaging in circuit-closing contact a pair of contact fingers 269 and a pair of contact fingers 271. For purposes of illustration, the contact carrying stem 266 is shown as of some suitable insulating material whereby to insulate the metallic contact members 267 and 268. The contact member 267 is fixed to the upper end of the stem 266. The contact member 268 has a central opening through which the stem 266 extends so that the contact member 268 may slide on the stem between two spaced flanges 273 and 274 formed integral with or attached to the stem 266.

A coil spring 275 interposed between the stop flange 274 and one side of the contact member 268 yieldingly urges the contact member 268 in the direction of the stop flange 273.

A spring 138a, corresponding to the spring 138 of the governor switch device 12, is provided which is so designed and so tensioned as to bias the stem 266 downwardly a sufficient degree so that neither the contact member 267 nor 268 engages the associated contact fingers in circuit-closing contact as long as the speed of travel of the car or train does not attain a certain moderate or medium speed, for example forty miles per hour. It will be understood that the contact member 268 is in such case yieldingly urged along the stem by the spring 275 until it engages the stop flange 273.

When the car or train attains a speed of for example forty miles per hour, the contact member 268 engages its associated contact fingers 271, but the stem 266 is at such time moved upwardly an insufficient distance to effect engagement of the contact-bridging member 267 with the contact fingers 269.

As the speed of the car or train increases above forty miles per hour, the stem 266 is raised further upwardly, the spring 275 at the same time yielding to permit slidable movement of the contact member 268 on the stem and at the same time increasing the force holding the contact member 268 in contact with the contact finger 271.

When the car or train attains a certain uniform high speed, such as sixty-five miles per hour, the upward movement of the stem 266 is sufficient to effect circuit-closing contact of the contact member 267 with the associated contact fingers 269.

As the speed of the car or train increases above sixty-five miles per hour, the degree of further upward movement of the stem 266 is limited since the fly-balls of the centrifuge have attained their maximum outward position and consequently the force on the contact fingers 269 is not unduly increased.

When the speed of the car or train decreases from a speed in excess of sixty-five miles per hour to a speed below sixty-five miles an hour, the contact member 267 disengages the contact fingers 269, but due to the action of the spring 275, contact member 268 is maintained in contact with its associated contact fingers 271. Spring 275 is effective to maintain the contact member 268 in contact with the contact fingers 271 until such time as the speed of the car or train reduces below forty miles per hour, at which time the stop flange 273 engages the contact member 268 and carries the contact member downwardly with the stem 266 to disengage the contact fingers 271.

Summarizing briefly as to the operation of the governor switch device 12A, it will be seen that for speeds of the car or train up to forty miles per hour both the contact members 267 and 268 are in circuit-opening position, that in the range of speeds from forty miles per hour to sixty-five miles per hour, only the contact member 268 is in circuit-closing position, and that for car or train speeds of sixty-five miles per hour or above, both the contact members 267 and 268 are in circuit-closing position. It will be understood that while I have used certain illustrative speeds so that the operation of the governor switch device 12A may be more readily understood, the governor switch 12A may be designed to effect operation of the contact members 267 and 268 into circuit-closing position at any desired speeds.

The relays 261, 262, 270, and 280 may be of any standard or conventional type. The relay 261 comprises two front contact members 282 and 283 which are in circuit-opening position when the relay is deenergized and which are actuated to circuit-closing position when the relay is energized.

The relay 262 comprises two front contact members 284 and 285 and a back contact member 286, the front contact members being in circuit-opening position and the back contact member being in circuit-closing position when the relay is deenergized. When the relay 262 is energized, the front contact members are actuated to circuit-closing position and the back contact member 286 is actuated to circuit-opening position.

The relay 270 comprises two front contact members 287 and 288, which are in circuit-opening position when the relay is deenergized and which are actuated to circuit-closing position when the relay is energized.

The relay 280 comprises a front contact member 291 and two back contact members 292 and 293, the front contact member being in circuit-opening position and the back contact members being in circuit-closing position when the relay is deenergized. When the relay 280 is energized, the front contact member is actuated to circuit-closing position and the back contact members 292 and 293 are actuated into circuit-opening position.

One terminal of the electromagnet winding of the relay 261 is connected to one of the contact fingers 269 of the governor switch device 12A, by a wire 295, the opposite terminal of the relay winding being connected to one terminal of the battery 34, as through a ground connection shown. One terminal of the electromagnet winding of the relay 262 is connected to one of the contact fingers 271 of the governor switch device 12A by a wire 296, the opposite terminal of the relay winding being connected to one terminal of the battery 34, as through a ground connection shown.

The remaining contact finger 269 and the remaining contact finger 271 of the governor switch device 12A are connected by the wire 211 and the branch wire 210 to one of the contact fingers 208 of the fluid-pressure-operated switch device 17.

It will thus be understood that with the contact member 206 of the pressure switch 17 in circuit-closing position, a circuit is established for energizing the relay 261 if the contact member 267 of the governor switch is in circuit-closing position. Similarly, it will be seen that when the pressure switch 17 is actuated into circuit-closing position, relay 262 is energized if the contact member 268 of the governor switch device 12A is in circuit-closing position.

One terminal of the electromagnet winding of the relay 270 is connected by a wire 297 to the contact segment 163 associated with the contact finger 162 of the retardation controller 13, the opposite terminal of the winding being connected through ground to the grounded terminal of the battery 34. One terminal of the electromagnet winding of the relay 280 is connected to the contact segment 164 associated with the contact finger 162 of the retardation controller, as by a wire 298, the opposite terminal of the relay winding being connected to the grounded terminal of the battery 34, as through a ground connection shown.

It will thus be understood that the relays 270 and 280 will be energized or deenergized depending upon the position of the contact finger 162 with respect to the contact segments 163 and 164, in the same manner as are the relays 27 and 28 of the embodiments shown in Fig. 1.

OPERATION OF EMBODIMENT SHOWN IN FIG. 2

In the subsequent description of the operation of the embodiment shown in Fig. 2, no attempt will be made to describe specifically an application of the brakes by straight-air, by automatic service, or by automatic emergency operation, it being understood that these different types of brake applications are effected in exactly the same manner as previously described in the case of the embodiment shown in Fig. 1.

For simplicity, therefore, only so much of the operation of the embodiment shown in Fig. 2 will be specifically described as follows upon the supply of control fluid under pressure to the straight-air pipe 23.

Assuming, therefore, that the car or train is traveling at a speed, such as one hundred miles per hour, and that the straight-air pipe 23 is charged to a certain pressure, such as seventy-five pounds per square inch, the high speed magnet valve device 101 and the intermediate speed magnet valve device 102 of the speed-controlled valve device 11 are energized in the manner to be presently described, and the brakes are applied with a braking force as determined by a brake cylinder pressure which bears a substantially one-to-one ratio to the pressure in the straight-air pipe.

It will be understood that since the pressure switch 17 is in circuit-closing position and since both of the contact members 267 and 268 of the governor switch device 12A are in circuit-closing position, the relays 261 and 262 will be energized. Furthermore, since the contact finger 162 of the retardation controller 13 is initially in contact with the contact segment 163, it will be understood that the relay 270 is also energized. The relay 280 will be deenergized since the contact finger 162 is not in engagement with the contact segment 164.

Circuits are accordingly completed for energizing the high speed train wire 31 and the intermediate speed train wire 32 which, of course, results in the energization of high speed magnet valve device 101 and the intermediate speed magnet valve device 102, the electromagnets of which are respectively connected to the train wires 31 and 32. For simplicity, the circuits will not be traced further than the train wires 31, 32 or 33, it being understood that energization of the train wires 31, 32 and 33 is synonymous with the energization of the high speed magnet valve device 101, the intermediate speed magnet valve device 102 and the low speed magnet valve device 103, respectively.

The circuit for energizing the high speed train wire 31 extends from the battery 34 through the pressure switch 17 to the wire 211, thence through the back contact member 292 of the deenergized relay 280, a wire 301, front contact member 282 of the relay 261 and train wire 31. A circuit is also established for connecting battery wire 211 to high speed train wire 31, which extends from the battery wire 211 through contact member 292 of relay 280, and then by way of wire 301, closed front contact member 287 of relay 270, a wire 290, front contact member 284 of relay 262 and a wire 300. The purpose of this parallel connection will be made apparent hereinafter.

The connection for energizing the intermediate train wire 32 may be briefly described as extending from the battery 34 through the pressure switch 17 and wire 211 to the point 302 whence the circuit divides into two parallel branches, hereinafter described, which ultimately join at a point 303, and thereafter extends through a wire 304, and front contact member 285 of the relay 262 to train wire 32. One of the parallel branches between the points 302 and 303 of the partial circuit just traced extends from the point 302 through a branch wire 305, back contact member 293 of the deenergized relay 280 and wire 304. The other parallel branch between the points 302 and 303 extends from the point 302 through the wire 211, a branch wire 306, a wire 307, front contact member 283 of the relay 261 and a wire 308 to the point 303.

As the rate of retardation of the car or train increases and the contact finger 162 of the retardation controller 13 accordingly passes out of the range A of rates of retardation into the range B in which the contact finger 162 is not in engagement with either the contact segment 163 or the contact segment 164, the relay 270 is deenergized. The deenergization of the relay 270 is without effect at this time, however, since the circuits and circuit connections from battery wire 11 to train wires 31 and 32, as just previously described, are maintained.

It will thus be understood that, as long as the speed of the car or train exceeds sixty-five miles per hour, an increase in the rate of retardation to a rate within the range B of retardation rates effects no change from the original one-to-one ratio established between the pressure in the brake cylinder and the pressure in the straight-air pipe 23.

Let it now be assumed that the rate of retardation of the car or train increases to a rate within the range C wherein the contact finger 162 engages the contact segment 164. The relay 280 is accordingly energized and the circuit connection for energizing the high speed train wire 31 through the back contact 292 of the relay 280 is interrupted by the shifting of the contact member 292 to circuit-opening position.

As a result of the energization of the relay 280 the back contact member 293 thereof is shifted to circuit-opening position but the train wire 32 is maintained energized through the parallel circuit through the front contact member 283 of the relay 261, which is maintained energized.

It follows, that, as a result of the deenergization of the high speed train wire 31, and the consequent deenergization of the high speed magnet valve device 101 of the speed-controlled valve device 11, brake cylinder pressure is reduced to such a degree that the ratio of brake cylinder pressure to the pressure in the straight-air pipe 23 is the same as the ratio of the effective area of the diaphragm 74 to the effective area of the diaphragm 73. If the control pressure established in the straight-air pipe 23 is assumed to be seventy-five pounds per square inch and the ratio of the area of the diaphragm 74 to the area of the diaphragm 73 to be as three is to four, it follows that the brake cylinder pressure will be reduced to three-fourths of seventy-five pounds per square inch or to approximately fifty-six pounds per square inch.

No further reduction in brake cylinder pressure can occur due to automatic control by the retardation controller 13, as long as the speed of the train exceeds sixty-five miles per hour. It will be understood, of course, that brake cylinder pressure may be reduced by reducing the pressure in the straight-air pipe as described in the case of the embodiment shown in Fig. 1.

Let it be assumed, however, that the pressure in the straight-air pipe 23 is maintained at the originally assumed pressure of seventy-five pounds per square inch, and that as a result of the application of the brakes, the speed of the train reduces from above to below a speed of sixty-five miles per hour.

As a result of the shifting of the contact member 267 of the governor switch device 12A to circuit-opening position and the consequent deenergization of the relay 261, the circuit connection previously described through which the intermediate speed wire 32 is maintained energized is interrupted by the shifting of the front contact member 283 of the relay 261 to circuit-opening position, assuming that the relay 280 remains energized and that the back contact member 293 of the relay 280 remains in circuit-opening position.

It follows, therefore, that the intermediate speed magnet valve device 102 of the speed-controlled valve device 11 is deenergized and that consequently brake cylinder pressure is reduced to a degree such that the ratio between the brake cylinder pressure and the pressure in the straight-air pipe 23 is the same as the ratio of the area of the diaphragm 75 to the area of the diaphragm 73. Assuming that the pressure of seventy-five pounds per square inch is maintained in the straight-air pipe 23 and that the ratio of the area of the diaphragm 75 to the area of the diaphragm 73 is as one is to two, it follows that the brake cylinder pressure is reduced to one-half of seventy-five pounds per square inch, or substantially thirty seven and one-half pounds per square inch.

Let it now be assumed that as a result of the reduction in brake cylinder pressure as just described, the rate of retardation of the car or train decreases so that the contact finger 162 of the retardation controller recedes backwardly out of contact with the contact segment 164 toward its normal position and into the range B of retardation rates. Relay 280 is accordingly deenergized and, as a result, the connection is again established for energizing the intermediate speed train wire 32 from the wire 211 through the back contact member 293 of the relay 280 and the front contact member 285 of the relay 262. It follows that with the re-energization of the intermediate speed magnet valve device 102 of the speed-controlled valve device 11, the pressure in the brake cylinder 10 is increased to the next highest ratio with respect to the straight-air pipe pressure, which ratio is the same as the ratio of the area of the diaphragm 74 to the area of the diaphragm 73. On the basis of diaphragm areas and straight-air pipe pressure previously assumed, it will be seen that brake cylinder pressure is restored to three-fourths of seventy-five pounds per square inch or approximately fifty-six pounds per square inch.

If the reduction in brake cylinder pressure produced as a result of the car or train reducing in speed from above to below sixty-five miles per hour is sufficient to effect such a decrease in the rate of retardation of the car or train that the contact finger 162 of the retardation controller recedes backwardly through the range B and enters the range A, in which the contact finger 162 engages the contact segment 163, a further increase in brake cylinder pressure to the next highest ratio, that is, a one-to-one ratio with respect to straight-air pipe pressure occurs. It will be seen that such is the case for the reason that the closing of contact member 287 of relay 270 due to energization of the relay 270 effected as a result of the engagement of the contact finger 162 of the retardation controller with the contact segment 163, completes the circuit connection previously traced from battery wire 211 to high speed train wire 31 through contact member 292 of relay 280, contact member 287 of relay 270 and contact member 284 of relay 262.

In the event that as the car or train is reducing in speed under the application of the brakes from sixty-five miles per hour toward forty miles per hour, the rate of retardation is again increased so that the contact finger 162 of the retardation controller 13 is again shifted successively into the ranges B and C, a reduction of brake cylinder pressure successively to three-quarters and one-half of that in the straight-air pipe pressure or fifty-six and thirty seven and one-half pounds per square inch respectively, is effected.

Let it now be assumed that while the car or train is decelerating at a rate of retardation within the range C, the speed of the train reduces below forty miles per hour. As a result of the consequent deenergization of the relay 262 and the shifting of the back contact member 286 of the relay 262 to circuit-closing position, a circuit is completed for energizing the low speed train wire 33, the connection from the wire 211 to the wire 33 being from the wire 211 through the wires 306 and 307, back contact member 286 of the relay 262, a wire 311, and front contact member 291 of the relay 280.

Keeping in mind that the high speed magnet valve device 101 and the intermediate speed magnet valve device 102 of the speed control valve device 11 are at this time deenergized and that the chambers 93 and 94 associated with the diaphragm are vented to atmosphere, the energization of the low speed magnet valve device 103 of the speed control valve device which occurs as a result of the energization of the low speed wire 33 causes fluid under pressure to be vented from the chamber 95 between the diaphragms 75 and 76.

Accordingly, it will be seen that brake cylinder pressure is reduced to such a degree that the pressure in the brake cylinder is in the same ratio to the pressure established in the straight-air pipe 23 as the effective area of the smallest diaphragm 76 is in ratio to the effective area of the largest diaphragm 73.

Assuming as in previous instances, that the straight-air pipe pressure is maintained at seventy-five pounds per square inch, and that the area of the diaphragm 76 is in a one-to-three ratio to the area of the diaphragm 73, it will be seen that the reduced pressure in the brake cylinder is one-third of the pressure in the straight-air pipe, or twenty-five pounds per square inch.

Now let it be assumed that as a result of the reduction in brake cylinder pressure as just described, the rate of retardation of the car or train decreases so that the contact finger 162 of the retardation controller recedes backwardly into the range B of retardation rates so as to disengage the contact segment 164.

In such case, the consequent deenergization of the relay 280 effects deenergization of the low speed train wire 33 and thus of the low speed magnet valve device 103 of the speed-controlled valve device 11, due to the shifting of the back contact member 291 of the relay 280 to circuit-opening position. Fluid under pressure is thus again supplied to the chamber 95 of the speed-controlled valve device 11 and the brake cylinder pressure is increased to the next highest ratio with respect to the straight-air pipe pressure, that is, to a one-to-two ratio. With a straight-air pipe pressure of seventy-five pounds per square inch, the brake cylinder pressure thus established will be one-half of seventy-five pounds per square inch or thirty-seven and one-half pounds per square inch.

In the event that the reduction in brake cylinder pressure effected at the time that the speed of the car or train reduced to a speed below forty miles per hour is such as to cause such a decrease in the rate of retardation that the contact finger 162 of the retardation controller recedes backwardly toward its normal position through the range B into the range A wherein it reengages the contact segment 163, a further increase in brake cylinder pressure to the next highest ratio, that is, to a three-to-four ratio, to straight-air pipe pressure is effected.

As a result of the energization of the relay 270 caused by the contact finger 162 engaging contact segment 163, a circuit is completed for energizing the intermediate speed train wire 32, the connection from the battery wire 211 to the train wire 32 being through the branch wire 306, the wire 307, back contact member 286 of the relay 262, wire 311, front contact member 288 of the relay 270, and a wire 313. As a result of the energization of the intermediate speed train wire 32 and the consequent energization of the intermediate speed magnet valve device 102 of the speed-controlled valve device 11, brake cylinder pressure is increased to the next highest ratio with respect to the straight-air pipe pressure which is the three-to-four ratio. With seventy-five pounds per square inch pressure in the straight-air pipe 23, the brake cylinder pressure thus established will be three-fourths of seventy-five pounds per square inch, or approximately fifty-six pounds per square inch.

It will be seen that when the car or train is completely stopped following the application of the brakes, the above described condition will obtain and the pressure in the brake cylinder is approximately fifty-six pounds per square inch, as just described. Thus, it will be understood that if a maximum pressure of seventy-five pounds per square inch is established in the brake cylinder for either a straight-air application or an automatic service application of the brakes, that the braking force holding the car or train at a standstill without reduction in the control pressure in the straight-air pipe is seventy-five per cent of the braking force for a full or maximum straight-air or automatic service application of the brakes. If the car or train is brought to a stop following an automatic emergency application of the brakes, wherein a straight-air pipe pressure of one hundred pounds per square inch is established, it will be seen that a brake cylinder pressure of seventy-five per cent of the straight-air pipe pressure will be seventy-five pounds per square inch, which is the same as the maximum brake cylinder pressure established for a straight-air application or an automatic service application of the brakes.

In the event that an application of the brakes is initiated at a time that the car or train is traveling at a speed between forty and sixty-five miles per hour, it will be seen that the initial brake cylinder pressure will have a ratio to the pressure established in the straight-air pipe which is the same as described above for the condition where the rate of retardation of the car or train is in the range A of retardation rates while the car or train is in the range of speed between forty and sixty-five miles per hour. This is a one-to-one ratio, and with seventy-five pounds per square inch pressure in the straight-air pipe, the brake cylinder pressure will be seventy-five pounds per square inch. Thereafter, as the rate of retardation of the car or train increases into the range B or the range C, or as the speed of the car or train reduces below forty miles per hour, brake cylinder pressure will be varied accordingly, as previously described.

If the application of the brakes is initiated at a time that the car or train is traveling at a speed below forty miles per hour, the brake cylinder pressure initially established will be in the same ratio to the straight-air pipe pressure as described above for the condition where the car or train is traveling at a speed below forty miles per hour and is decelerating with a rate of retardation within the range A. This is a ratio of three-to-four and on the basis of a pressure of seventy-five pounds per square inch established in the straight-air pipe, the initial brake cylinder pressure established will be approximately fifty-six pounds per square inch.

Thereafter, as the speed of the car or train reduces and the rate of retardation of the car or train necessarily increases into either the range B or the range C, brake cylinder pressure will be increased in succession to the next two lower ratios with respect to the straight-air pipe pressure, namely a one-to-two ratio and one-to-three ratio. On the basis of a pressure of seventy-five pounds per square inch established in the straight-air pipe, the actual pressure in the brake cylinder thus successively established will be thirty-seven and one-half pounds per square inch and twenty-five pounds per square inch.

It will be apparent, however, that regardless of the speed of the car or train at the time the application of the brakes is initiated, the final ratio of the brake cylinder pressure to the control pressure established in the straight-air pipe 23 when the car or train is at a stop will always be in the ratio of the effective area of the diaphragm 74 to the effective area of the diaphragm 73, which on the basis of the figures assumed would be a ratio of three-to-four.

EMBODIMENT SHOWN IN FIG. 3

Another embodiment of my invention may be provided which differs in certain respects from the embodiment shown in Fig. 1. For simplicity, only so much of this embodiment is shown in Fig. 3 as serves to disclose structural and operational differences with respect to the embodiment shown in Fig. 1, corresponding wires, pipes and other parts of the equipment in the two embodiments being correspondingly numbered.

The embodiment shown in Fig. 3 differs, principally, from the embodiment shown in Fig. 1 in the provision of a governor switch device 12B having three contact bridging members instead of one, and in the provision of a retardation controller 13A which differs from the retardation controller 13 of the embodiment shown in Fig. 1 in effecting variations in the braking force depending upon the rate of retardation of the car or train being within any one of four ranges of rates of retardation instead of three ranges.

The embodiment shown in Fig. 3 differs further from the embodiment shown in Fig. 1 in the provision of a relay 321 of the retarded type, hereinafter termed the transfer relay and in the provision of two relays 322 and 323 in place of the relays 27 and 28.

The governor switch device 12B is to some extent similar to the governor switch device 12 in respect to having a slidable stem 325, the position of which is adjusted according to the relation of opposing forces exerted by a biasing spring 138b corresponding to the biasing spring 138 and that exerted by a centrifuge device corresponding to the centrifuge 141. The stem 325 carries three contact-bridging members 326, 328 and 330 adapted, respectively, to engage in circuit-closing relation, a pair of contact fingers 327, a pair of contact fingers 329, and a pair of contact fingers 331. For simplicity, the stem 325 is indicated as being of insulating material whereby the contact-bridging members 326, 328 and 330 are insulated from each other.

The contact member 326 is fixed to the upper end of the stem 325. The contact member 328 has a central opening therein through which the stem 325 extends and is slidably movable on the stem between a pair of spaced stop shoulders or flanges 333 and 334 formed integrally with or attached to the stem 325. A coil spring 335 interposed between the stop flange 334 and the lower face of the contact member 328 serves to yieldingly urge the contact member 328 along the stem 325 toward the stop flange 333.

The contact member 330 has a central opening through which the stem 325 extends and is slidably movable along the stem between the stop flange 334 and another stop flange 336 spaced from the flange 334 at a point lower down on the stem 325. A coil spring 337 interposed between the stop flange 334 and the upper face of the contact member 330 yieldingly urges the contact member 330 along the stem in the direction of the stop flange 336.

The centrifuge and the biasing spring 138b of the governor switch device 12B are so designed and the pairs of contact fingers 327, 329 and 331 are so spaced that when the car or train is traveling at a speed in excess of a certain uniform high speed, such as sixty-five miles per hour, the contact members 326 and 328 engage their associated contact fingers in circuit-closing contact while the contact member 330 is raised out of engagement with its associated contact fingers 331. As the speed of the car or train reduces from above to below sixty-five miles per hour, the lowering of the stem 325 effects disengagement of the contact member 326 from its associated contact fingers, but the contact member 328 remains in engagement with its associated contact fingers due to the spring 335 urging the contact member along the stem toward the stop flange 333. At this time contact member 330 is still out of contact with its associated contact fingers. When the speed of the car or train reduces below an intermediate speed, such as forty miles per hour, the contact member 328 is disengaged from its associated contact fingers due to the fact that the stop flange 333 has engaged the contact member 328 and caused it to move downwardly with the stem 325. The contact member 330 is still raised out of contact with its associated contact fingers.

When the speed of the car or train reduces below a certain low speed, such as twenty miles per hour, the stem 325 is lowered sufficiently to effect the engagement of the contact member 330 with its associated contact fingers. Thereafter, as the speed of the car or train reduces below twenty miles per hour and as long as the speed of the car or train remains below twenty miles per hour, the contact member 330 remains in engagement with its associated contact fingers, the spring 337 being compressed as the stem 325 descends to permit movement of the contact member 330 along the stem 325 upwardly from the stop flange 336.

Summarizing as to the governor switch device 12B, it will be seen that for a train speed of a predetermined high speed, such as sixty-five miles per hour, and higher, the contact members 326 and 328 are in circuit-closing position whereas the contact member 330 is in circuit-opening position. When the train is traveling at a speed from an intermediate speed such as forty miles per hour to the high speed of sixty-five miles per hour only the contact member 328 is in circuit-closing position. When the train is traveling over the range of speeds between a relatively low speed of for example twenty miles per hour and the intermediate speed, of forty miles per hour none of the contact members 326, 328 and 330 are in circuit-closing position. When the train is traveling at a speed lower than the predetermined low speed of twenty miles per hour, and as long as the speed of the train remains less than twenty miles per hour, only contact member 330 is in circuit-closing position.

The retardation controller 13A differs from the retardation controller 13 of the previous two embodiments in having three contact segments 341, 342 and 343 in spaced insulated relation along the arc of travel of the contact finger 162 and which are adapted to be engaged by the contact finger 162 in the manner to be presently described. The contact segment 341 is located so as to be engaged by the contact finger 162 in the normal position thereof, that is, for a zero rate of retardation and is of such length that the contact finger 162 remains in engagement therewith until the rate of retardation of the car or train attains a certain low degree such as two miles per hour per second.

The contact finger 162 of the retardation controller engages the contact segment 342 substantially simultaneously with its disengagement from the contact segment 341, and remains in engagement with the contact segment 342 as the rate of retardation of the car or train increases until such time as the rate of retardation exceeds an intermediate rate, such as two and one-half miles per hour per second, whereupon the contact finger 162 disengages the contact segment 342.

As the rate of retardation of the car or train increases above the intermediate rate, assumed to be two and one-half miles per hour per second, the contact finger 162 of the retardation controller 13A travels through an arc in which it does not engage any of the contact segments 341, 342 or 343.

When the rate of retardation of the car or train exceeds a relatively high rate, such as three miles per hour per second, the contact finger 162 engages the contact segment 343 and remains in contact with the contact segment 343 for all higher rates of retardation.

For convenience, the range of rates of retardation in which the contact finger 162 of the retardation controller 13A engages the contact segment 341 will be hereinafter designated range M, the range in which the contact finger 162 engages the contact segment 342 will be designated range N, the range in which the contact finger 162 is not in engagement with any of the contact segments associated therewith will be designated range O, and the range of rates of retardation in which the contact finger 162 engages the contact segment 343 will be designated range P.

The transfer relay 321, which as previously stated is of the retarded type, comprises an electromagnet winding 351 and three separate contact members 352, 353 and 354. The relay 321 is further provided with suitable dampening or retarding means so that the contact members 352, 353 and 354 remain in a lower position for a predetermined uniform length of time, such as ten or fifteen seconds, following the initial energization of the electromagnet winding 351 of the relay, the contact members being shifted to upper positions thereof respectively upon the elapse of such predetermined uniform length of time.

In the lower position thereof, the contact member 352 of the relay 321 connects one of the contact fingers 327 of the governor switch device 12B to the high speed train wire 31 in the manner shown. In a similar manner, the contact member 353 in the lower position thereof connects one of the contact fingers 329 of the governor switch device 12B to the intermediate speed train wire 32, and the contact member 354 in the lower position thereof connects one of the contact fingers 331 of the governor switch device 12B to the low speed train wire 33.

In the upper position thereof, the contact members 352, 353 and 354 respectively interrupt the connection from the contact fingers of the governor switch device 12B to the train wires 31, 32 and 33, respectively, and connect the train wires 31, 32 and 33 to three wires 361, 362 and 363, respectively.

The relay 322 is of any suitable construction and comprises an electromagnet winding 356 and two front contact members 357 and 358. When the electromagnet winding 356 of the relay 322 is deenergized, the contact members 357 and 358 are both in circuit-opening position and when the electromagnet winding 356 is energized, the contact members are both shifted to circuit-closing position.

The relay 323 is also of any suitable construction and comprises an electromagnet winding 366 and two back contact members 367 and 368. When the electromagnet winding 366 of the relay 323 is deenergized, the contact members 367 and 368 are both in circuit-closing position, and when the electromagnet winding 366 is energized both contact members are shifted to circuit-opening position.

As in the previous two embodiments, when fluid under pressure is supplied to the straight-air pipe 23, the pressure switch device 17 is actuated to circuit-closing position to connect one terminal of the battery 34 to the wire 211, previously termed the battery wire. One terminal of the electromagnet winding 351 of the transfer relay 321 is connected to the battery wire 211, the opposite terminal of the electromagnet winding 351 being connected to the opposite terminal of the battery 34, as through a ground connection in the manner shown. It will thus be seen that, whenever the pressure switch 17 is actuated to circuit-closing position, the transfer relay 321 is energized and that, following the elapse of the predetermined uniform time of ten or fifteen seconds, the contact members 352, 353 and 354 of the transfer relay 321 are shifted from their lower to their upper positions.

Battery wire 211 is connected by three branch wires 377, 379 and 381, respectively, to a contact finger 327, a contact finger 329 and a contact finger 331 of the governor switch device 12B.

It will thus be seen that when the contact member 326 of the governor switch device 12B is in circuit-closing position it connects the battery wire 211 to the high speed train wire 31, assuming that the contact member 352 of the transfer relay 321 is in its lower position. In a similar manner, it will be seen that the contact member 328 of the governor switch device, when in circuit-closing position, connects the battery wire 211 to the intermediate speed wire 32 and that the contact member 330, when in circuit-closing position, connects the battery wire 211 to the low speed wire 33.

As in previous embodiments, the contact finger 162 of the retardation controller 13A is connected by a wire 214 to the battery wire 211. One terminal of the electromagnet winding 356 of the relay 322 is connected to a terminal of the battery 34, as through a ground connection in the manner shown, and the other terminal of the electromagnet winding 356 is connected to a wire 382 which is connected by the contact member 368 of the relay 323 to a wire 383 that is connected to the contact segment 341 of the retardation controller.

The contact member 367 of relay 323 is effective, when the relay is deenergized, to connect a branch wire 384 of the wire 362, leading from the transfer relay 321, to a wire 385 which is connected to the contact segment 342 of the retardation controller.

One terminal of the electromagnet winding 366 of the relay 323 is connected, as through a ground connection, to one terminal of the battery 34, the other terminal of the winding 366 being connected by a branch wire 386 to the wire 363 which is in turn connected to the contact segment 343 of the retardation controller.

OPERATION OF EMBODIMENT SHOWN IN FIG. 3

As in the case of the embodiment shown in Fig. 2, no attempt will be made to describe a straight-air, an automatic service, or an automatic emergency application of the brakes specifically, the operation being described on the assumption that fluid under pressure is supplied to the control or straight-air pipe 23 to a chosen degree, such as seventy-five pounds per square inch.

Assuming, therefore, that an application of the brakes is initiated at a time that the car or train is traveling at a speed of for example, one hundred miles per hour, it will be seen that the brake cylinder pressure with which the brakes are initially applied will bear a maximum or one-to-one ratio to the control pressure in the straight-air pipe 23.

Upon the closing of the pressure switch 17, transfer relay 321 is energized but, as previously explained, the contact members thereof remain in their lower position until a predetermined uniform time has elapsed. Since the assumed train speed is in excess of the predetermined high speed of sixty-five miles per hour, it will be seen that the high speed train wire 31 and the intermediate speed train wire 32 are energized by connection to the battery wire 211 through the contact members 326 and 328, respectively, of the governor switch device 12B. It will thus be understood that, since the high speed magnet valve device 101 and the intermediate speed magnet valve device 102 of the speed-controlled valve device 11 are accordingly energized while the low speed magnet valve device 103 is deenergized, the speed-controlled valve device 11 is operated to effect the maximum or one-to-one ratio of brake cylinder pressure to the control pressure in the straight-air pipe 23.

Let it now be assumed that upon the elapse of the certain uniform time, the transfer relay 321 is actuated to shift the contact members thereof from the lower position to the upper position, while the train is still traveling at a speed in excess of sixty-five miles per hour. The effect of such operation of the transfer relay 321 is to cut out the governor switch device 12B and transfer the control of brake cylinder pressure to the retardation controller 13A. If the car or train is decelerating at a rate of retardation within the range M wherein the contact finger 162 engages the contact segment 341, at the time transfer relay 321 is operated to the upper position, no change from the originally established brake cylinder pressure is effected. This is so because the relay 322 is energized when the contact finger 162 of the retardation controller engages with the contact segment 341, and therefore the high speed train wire 31 and the intermediate speed train wire 32 are maintained connected to the battery wire 211 through the contact members 358 and 357, respectively, of the relay 322.

If, at the time that the contact members of the transfer relay 321 are shifted from their lower to their upper position, the train is decelerating at a rate of retardation within the range N, wherein the contact finger 162 engages the contact segment 342, brake cylinder pressure is reduced to the next lower ratio with respect to the control pressure in the straight-air pipe 23, that is, on the basis of the illustrative diaphragm areas assumed previously, to three-fourths of the pressure in the straight-air pipe or approximately fifty-six pounds per square inch. It will be seen that such is the case because the high speed train wire 31 is deenergized as a result of the shifting of the contact member 358 of relay 322 to circuit-opening position. The intermediate speed train wire 32 is not deenergized, although the contact member 357 of the relay 322 is shifted to circuit-opening position, because a connection is established from the battery wire 211 to train wire 32 through the contact finger 162 of the retardation controller, the contact segment 342, wire 385, contact member 367 of the now deenergized relay 323, wires 384 and 362, and contact member 353 of the transfer relay 321.

If, now as the speed of the train or car diminishes due to the application of the brakes, the rate of retardation increases to such an extent that the contact finger 162 enters the range O of retardation rates, brake cylinder pressure is further reduced to the next lower ratio with respect to the control pressure in the straight-air pipe 23, that is, to one-half of seventy-five pounds per square inch or thirty-seven and one-half pounds per square inch. It will be seen that such is the case, because the circuit, just traced, for energizing the intermediate speed train wire 32 is interrupted by the disengagement of the contact finger 162 from the contact segment 342.

If the rate of retardation of the car or train further increases to within the range P, assuming that the speed of the car or train still remains above sixty-five miles per hour, brake cylinder pressure is reduced to the lowest ratio with respect to the control pressure in the straight-air pipe 23, that is, to one-third of seventy-five pounds per square inch or twenty-five pounds per square inch. It will be seen that this is so because the engagement of the contact finger 162 with the contact segment 343 connects the battery wire 211 to the wire 363, which is connected to the low speed train wire 33 by the contact member 354 of transfer relay 321.

It will be seen that the low speed train wire 33 is so interlocked with the intermediate speed train wire 32 and high speed train wire 31 by the relays 322 and 323 that when the low speed train wire 33 is energized, the wires 31 and 32 are locked out of possible connection to the battery wire 211. Clearly, upon the energization of the relay 323 and the consequent shifting of the contact member 367 to circuit-opening position, connection from the battery wire 211 to the intermediate speed train wire 32 through the contact member 367 of relay 323 is prevented. Also energization of the relay 322 is prevented due to the shifting of the contact member 368 of relay 323 to circuit-opening position and, as a result, contact members 357 and 358 of the relay 322 are maintained in circuit-opening position to prevent a connection from the battery wire 211 to either the high speed train wire 31 or the intermediate speed wire 32.

Since the governor switch device 12B is locked out of connection with the train wires 31, 32 and 33 by the transfer relay 321, it will be apparent that subsequent control of brake cylinder pressure as the car or train reduces in speed is solely under the control of the retardation controller 13A, brake cylinder pressure being varied in ratio to the control pressure in the straight-air pipe 23 depending upon the contact finger 162 being within the ranges M, N, O and P, in the manner described.

If at the time an application of the brakes is initiated, the car or train is traveling at a speed, such as fifty miles per hour, the initial brake cylinder pressure established will be three-fourths of the control pressure in the straight-air pipe 23 or approximately fifty-six pounds per square inch. Obviously, if the train is traveling at a speed of fifty miles per hour, only the contact member 328 of the governor switch device 12B is in circuit-closing position, and thus only the intermediate speed train wire 32 is initially energized.

Thereafter, when the transfer relay 321 is operated to shift its contact members from their lower to their upper seated positions, the retardation controller 13A assumes sole control of brake cylinder pressure in exactly the same manner as previously described.

If the car or train is traveling at a speed, such as thirty miles per hour, at the time an application of the brakes is initiated, the brake cylinder pressure initially established will be one-half of the control pressure in the straight-air pipe 23 or thirty-seven and one-half pounds per square inch. Such is the case because, with the car or train traveling at a speed of thirty miles per hour, none of the contact members 326, 328 or 330 of the governor switch device 12B are in circuit-closing position and thus all of the train wires 31, 32 and 33 are initially deenergized. Subsequently, as the transfer relay 321 is operated and the retardation controller 13A assumes control of brake cylinder pressure, variation in brake cylinder pressure is effected solely in accordance with variations in the rates of retardation, in the manner previously described.

If the car or train is traveling at a speed, such as fifteen miles per hour, at the time an application of the brakes is initiated, the initial brake cylinder pressure established will be one-third of the control pressure in the straight-air pipe 23 or twenty-five pounds per square inch. This is so because, with the train traveling at a speed of fifteen miles per hour, only the contact member 330 of the governor switch device 12B is in circuit-closing position and thus only the low speed train wire 33 is initially energized. Subsequently, upon the transfer of the control by the transfer relay 321 to the retardation controller 13A, brake cylinder pressure is varied solely according to variations in the rate of retardation in the manner previously described.

It will be understood that if, following the application of the brakes while the train is traveling at a speed within a certain speed range, the speed of the car or train reduces to within the next lower speed range before the transfer relay 321 is operated to shift the control of brake cylinder pressure to the retardation controller, the governor switch device 12B is effective to reduce brake cylinder pressure to the next lower ratio with respect to the control pressure in the straight-air pipe 23.

It will be understood, further, that when the car or train is completely stopped following an application of the brakes, brake cylinder pressure is automatically increased to the maximum or one-to-one ratio with respect to the control pressure in the straight-air pipe 23. Obviously, when the car or train is stopped, the contact finger 162 of the retardation controller is returned to its normal position in contact with the contact segment 341 and accordingly the relay 322 is energized and the contact members 357 and 358 thereof accordingly shifted to circuit-closing position to connect the battery wire 211 to the high speed train wire 31 and intermediate speed train wire 32 respectively.

EMBODIMENT SHOWN IN FIG. 4

The embodiment shown in Fig. 4 indicates the manner in which previously described embodiments may be applied in the control of the brakes on a train of cars and incidentally shows a modified system from that shown in any of the previous embodiments, for controlling the braking force during an application of the brakes.

For simplicity, only such differences of the embodiment shown in Fig. 4 with respect to the embodiment shown in Fig. 1 will be pointed out as will serve to give an understanding of the equipment and its operation.

The equipment shown in Fig. 4 differs from that shown in Fig. 1 in the provision of a governor switch device 12B which is of the type shown in the embodiment of Fig. 3, a retardation controller device 13B which differs from the retardation controller devices 13 and 13A only in respect to the switch arrangement of the contact finger 162 thereof with respect to associated contact segments. Further differences include the provision of two groups of relays, one group on each of two different cars, and each group comprising three governor switch controlled relays 391, 392 and 393 and a single relay 394 controlled by operation of the retardation controller 13B. It will be noted also that, instead of a single governor switch device and a single pressure switch device 17, two governor switch devices 12B and two pressure switches 17 are provided, one governor switch and one pressure switch being on one car of the train while another governor switch and another pressure switch are located on a different car.

Associated with the contact finger 162 of the retardation controller 13B is a single contact segment 396 which is engaged by the contact finger 162 only when the rate of retardation of the car or train attains a certain uniform rate, such as three miles per hour per second and continues to exceed such rate.

Since the relays 391, 392, 393 and 394 on the one car, hereinafter called car 1, and corresponding relays on another car, hereinafter called car 4, are identical, only one description of each relay will be given. The relay 391 comprises an electromagnet winding 397 and two front contact members 398 and 399, the contact members being in circuit-opening position when the electromagnet 397 is deenergized and being shifted to circuit-closing position when the electromagnet 397 is energized.

The relay 392 comprises an electromagnet winding 401, a front contact member 402, and a back contact member 403, the front and back contact members being respectively in circuit-opening and circuit-closing positions when the electromagnet winding 401 is deenergized, and in circuit-closing and circuit-opening positions, respectively, when the electromagnet winding is energized.

The relay 393 comprises an electromagnet winding 405 and a single front contact member 406 which is in circuit-opening position when the relay electromagnet 406 is deenergized and which is shifted to circuit-closing position when the electromagnet is energized.

The relay 394 comprises an electromagnet 408, one front contact member 409, and two back contact members 410 and 411, the front contact member and the two back contact members being respectively in circuit-opening and circuit-closing positions when the electromagnet 408 is deenergized, and in circuit-closing and circuit-opening position respectively, when the electromagnet 408 is energized.

As to the control circuits, only those for car 1 will be described, it being understood that those for car 4 duplicate those for car 1.

One terminal of the electromagnet 397 of the relay 391 is connected, as through ground in the manner shown, to one terminal of the battery 34, the other terminal of the electromagnet being connected by a wire 413 to one contact finger 327 of the governor switch device 12B, and the other contact finger 327 being connected by a wire 414 to the battery wire 211. Thus, with the pressure switch 17 in circuit-closing position and contact member 326 of the governor switch device 12B in circuit-closing position, the relay 391 is energized.

One terminal of the electromagnet 401 of the relay 392 is connected, as through a ground connection in a manner shown, to one terminal of the battery 34, the other terminal being connected by a wire 415 to one of the contact fingers 329 of the governor switch device 12B, and the other contact finger 329 being connected by a wire 416 to the battery 211. Thus, with the pressure switch 17 in circuit-closing position and the contact member 328 of the governor switch device 12B in circuit-closing position, the relay 392 is energized.

One terminal of the electromagnet 405 of the relay 393 is connected, as through a ground connection in the manner shown, to one terminal of the battery 34, the other terminal of the electromagnet 405 being connected by a wire 417 to one of the contact fingers 331 of the governor switch device 12B, the other contact finger 331 of which is connected by a wire 418 to the battery wire 211. Thus, with the pressure switch 17 in circuit-closing position and the contact member 330 of the governor switch device 12B in circuit-closing position, the relay 393 is energized.

One terminal of the electromagnet 408 of each of the relays 394 is connected, as through a ground connection in the manner shown, to one terminal of the battery 34, the opposite terminal of the electromagnet 408 of each relay 394 being connected by a wire 421 to the contact segment 396 of the retardation controller 13B. The contact finger 162 being connected to the battery wire 211 by the wire 214 as in previous embodiments, it will be seen that, with the pressure switch 17 in circuit-closing position, the engagement of the contact finger 162 of the retardation controller with the contact segment 396 effects energization of the relays 394 on car 1 and car 4.

OPERATION OF EMBODIMENT SHOWN IN FIG. 4

As in the case of the embodiments shown in Figs. 2 and 3, no attempt will be made to specifically describe a straight-air application, an automatic service application or an automatic emergency application of the brakes, it being understood, however, that such operation is intended.

Assuming, therefore, that an application of the brakes is effected and that a control pressure of, for example, seventy-five pounds per square inch, is established in the straight-air pipe 23 at a time that the car or train is traveling at a speed, such as one hundred miles per hour, the initial brake cylinder pressure bears a maximum ratio of one-to-one with respect to the control pressure in the straight-air pipe 23. Obviously, since the train is traveling a speed of one hundred miles per hour, the contact members 326 and 329 of the governor switch device 12B are in circuit-closing position while the contact member 330 is in circuit-opening position. Accordingly, the relays 391 and 392 are energized while the relay 393 is deenergized. Since the rate of retardation of the car or train is initially such that the contact finger 162 of the retardation controller is out of engagement with the contact segment 396 the relay 394 is deenergized at this time. It follows, therefore, that the shifting of the contact member 398 of the relay 391 to circuit-closing position connects the battery wire 211 to the high speed train wire 31 through a branch wire 425, back contact member 410 of the relay 394, a wire 426, and contact member 398 of the relay 391, thereby effecting energization of the train wire 31.

The closing of the contact member 402 of the relay 392 connects the battery wire 211 to the intermediate speed train wire 32 through branch wire 425, a second branch wire 428, back contact member 411 of the relay 394, a wire 429, and contact member 402 of the relay 392, thereby effecting energization of the train wire 32.

As the speed of the car or train reduces, remaining, however, in excess of the predetermined high speed of sixty-five miles per hour, the rate of retardation of the car or train increases until the contact finger 162 engages the contact segment 396 which causes energization of the relay 394. The consequent shifting of the contact member 410 of the relay 394 to circuit-opening position interrupts the connection from the battery wire 211 to the high speed train wire 31 and, accordingly, brake cylinder pressure is reduced to the next lower ratio with respect to the control pressure in the straight-air pipe 23, the pressure established in the brake cylinder being, therefore, three-fourths of seventy-five pounds per square inch or approximately fifty-six pounds per square inch.

It will be observed, that although the contact member 411 of the relay 394 is shifted to circuit-opening position due to relay 394 being energized, the intermediate speed train wire 32 is not deenergized because it remains connected to the battery wire 211 by way of the contact member 399 of the relay 391, wires 501 and 429, and contact member 402 of the relay 392.

No further variation in brake cylinder pressure occurs as long as the speed of the train is in excess of sixty-five miles per hour unless the rate of retardation of the car or train should for some reason reduce below the rate necessary to maintain the engagement of the contact finger 162 with the contact segment 396, in which case brake cylinder pressure is restored to the maximum ratio of one-to-one with respect to the control pressure in the straight-air pipe 23.

Now let it be assumed that, due to the application of the brakes, the speed of the car or train reduces from above sixty-five miles per hour to below sixty-five miles per hour while the rate of retardation is high enough to maintain contact finger 162 of the retardation controller in engagement with contact segment 396. As a result, relay 391 is deenergized and the shifting of the contact member 399 of the relay 391 to circuit-opening position interrupts the circuit therethrough just described for maintaining the intermediate speed train wire 32 energized. Accordingly, the intermediate speed train wire 32 is disconnected from the battery wire 211 and, as a result, the brake cylinder pressure is reduced to the next lower ratio with respect to the control pressure in the straight-air pipe 23, that is, the brake cylinder pressure is reduced to one-half of the pressure in the straight-air pipe 23 or thirty-seven and one-half pounds per square inch.

As long as the rate of retardation of the car or train exceeds the certain uniform rate necessary to maintain the contact finger 162 of the retardation controller 13B in contact with the contact segment 396, no further variation in brake cylinder pressure occurs while the speed of the car or train remains within the range from forty miles per hour to sixty-five miles per hour. In the event, however, that the reduction in brake cylinder pressure effected when the speed of the car or train reduces from above to below sixty-five miles per hour causes such a reduction in the rate of retardation of the car or train that the contact finger 162 recedes backwardly toward its normal position and disengages contact segment 396, then the brake cylinder pressure is again increased to the next higher ratio with respect to the control pressure in the straight-air pipe 23, that is, the pressure in the brake cylinder is increased to three-fourths of the pressure in the straight-air pipe 23 or approximately fifty-six pounds per square inch. It will be seen that such is the case, because upon the shifting of the contact member 411 of the relay 394 to circuit-closing position as a result of the deenergization of the relay 394, the connection from the battery wire 211 to the intermediate speed train wire 32 is again established by way of the contact member 411 of relay 394 and contact member 402 of the relay 392.

Let it now be assumed that due to the application of the brakes and the consequent reduction in speed of the car or train toward forty miles per hour the rate of retardation of the car or train is again increased to the point where the contact finger 162 reengages the contact segment 396. In such case the shifting of the contact member 411 of relay 394 to circuit-opening position again interrupts the connection from the battery wire 211 to the intermediate speed train wire 32 and as a result brake cylinder pressure is again reduced to the next lower ratio with respect to the control pressure in the straight-air pipe 23, that is, to a pressure of one-half of seventy-five pounds per square inch or thirty-seven and one-half pounds per square inch.

As the speed of the car or train reduces from above forty miles per hour to below forty miles per hour, the relay 392 is deenergized because of the shifting of the contact member 328 of the governor switch device 12B to circuit-opening position. As a result of the shifting of the contact member 403 of the relay 392 to circuit-closing position, the connection is established from the battery wire 211 to the low speed train wire 33 by way of a branch wire 503 of the battery wire 211, contact member 403 of the relay 392, a wire 504, contact member 409 of the relay 394, now energized.

As a result of the energization of the low speed train wire 33, the speed-controlled valve device 11 is operated to effect a reduction in brake cylinder pressure to the lower ratio with respect to the control pressure in the straight-air pipe 23, that is, a pressure of one-third of seventy-five pounds per square inch or twenty-five pounds per square inch.

As long as the rate of retardation of the car or train is in excess of the certain uniform degree and the contact finger 162 of the retardation controller accordingly engages contact segment 396, no further change occurs in brake cylinder pressure, while the speed of the car or train remains in the speed range from twenty to forty miles per hour. However, if the reduction in brake cylinder pressure effected when the speed reduced from above to below forty miles per hour causes such a reduction in the rate of retardation that the contact finger 162 of the retardation controller recedes toward its normal position and disengages the contact segment 396, then the shifting of the contact member 409 of the relay 394 to circuit-opening position interrupts the connection from the battery wire 211 to the low speed train wire 33 and, consequently, the speed-controlled valve device 11 is operated to increase the pressure in the brake cylinder to the next higher ratio with respect to the control pressure in straight-air pipe 23, that is, to a pressure of one-half of seventy-five pounds per square inch or thirty-seven and one-half pounds per square inch.

Let it be assumed, however, that following the reduction in the train speed below forty miles per hour, the rate of retardation of the car or train remains sufficiently high that the contact finger 162 remains in engagement with the contact finger 396. In such case, when the train speed reduces below twenty miles per hour due to the application of the brakes, the brake cylinder pressure is not varied from its pressure of one-third of the pressure in the straight-air pipe, that is, from twenty-five pounds per square inch, because the energization of the relay 393, as a result of the shifting of the contact member 330 of the governor switch device 12B into circuit-closing position, merely establishes a parallel circuit connection from the battery wire 211 to the low speed train wire 33 in parallel with the existing connection by way of the contact member 403 of the relay 392 and the contact member 409 of the relay 394.

When the car or train is brought to a complete stop and the contact finger 162 of the retardation controller 13B returns to its normal position out of engagement with the contact segment 396, the shifting of the contact member 409 of the relay 394 to circuit-opening position is ineffective to interrupt the energization of the low speed train wire 33 because the connection from the battery wire 211 to the low speed train wire 33 is maintained by way of the contact member 406 of the relay 393. Consequently, the retardation controller 13B is ineffective to vary the brake cylinder pressure when the speed of the car or train is below twenty miles per hour and the brake cylinder pressure established when the car or train is completely stopped remains in all cases at the lowest ratio with respect to the control pressure in straight-air pipe 23 and is, accordingly, one-third of seventy-five pounds per square inch or twenty-five pounds per square inch.

It will be apparent that if the application of the brakes is initiated at a time that the train is traveling at a speed of for example, fifty miles per hour, the maximum initial brake cylinder pressure established will be only three-fourths of seventy-five pounds per square inch, that is, approximately fifty-six pounds per square inch. This is so because only the relay 392 is energized in the range of speed from forty to sixty-five due to the fact that only the contact member 328 of the governor switch device 12B is in circuit-closing position.

If the application of the brakes is initiated at a time that the train is traveling at a speed of, for example, thirty miles per hour, the initial brake cylinder pressure established will be one-half of the control pressure of the straight-air pipe 23, or thirty-seven and one-half pounds per square inch.

It will be that such is the case, because with the contact finger 162 of the retardation controller 13B initially out of contact with the contact segment 396 and with none of the relays 391, 392 or 393 energized, none of the train wires 31, 32 or 33 can be energized.

Since as previously stated, the retardation controller 13B is of no effect in controlling brake cylinder pressure if the application of the brakes is initiated at a speed below twenty miles per hour, it follows that if the application of the brakes is initiated at a time that the train is traveling at a speed below twenty miles per hour, the initial brake cylinder pressure established will be in its lowest ratio with respect to the control pressure in the straight-air pipe, that is one-third of seventy-five pounds per square inch or twenty-five pounds per square inch.

ADAPTATION OF INVENTION TO A TRAIN BRAKE CONTROL SYSTEM

Each of the embodiments shown in Figs. 1, 2 and 3 may be employed in controlling the brakes on a train of cars of either the articulated or non-articulated type, it being understood that the high speed magnet valve devices 101, 102 and 103 of the speed-controlled valve device 11 on each car are connected to the train wires 31, 32 and 33, respectively, in the manner indicated in Fig. 4.

Furthermore, while only one governor switch device is shown in each of the embodiments of Figs. 1, 2 and 3, it will be understood that a plurality of parallel-connected governor switch devices may be employed for greater safety and to insure against failure to properly apply the brakes in the event of failure of the single governor switch device.

If desired, the brake cylinder pressure on any particular car, such as the traction or power vehicle may be limited to a ratio lower than the maximum ratio of one-to-one with respect to the straight-air pipe pressure. For example, if it is desired to limit brake cylinder pressure to a maximum ratio with respect to control pressure in straight-air pipe 23 of three-fourths of the straight-air pipe pressure, then it is necessary only to disconnect the high speed magnet valve device 101 of the speed-controlled valve device 11 on that car from the high speed train wire 31.

If such arrangement is contemplated as a permanent system, the speed-controlled valve device 11 for the car on which the lower maximum braking ratio is desired may be constructed with the high speed magnet valve device 101 omitted therefrom.

It will, furthermore, be understood that in the adaptation of the various embodiments to a train brake control system, local supply reservoirs on each car may be provided which may be charged in well known manner from the brake pipe 24 so as to secure an adequate supply of fluid under pressure on each car instead of relying on a single pipe such as the main reservoir pipe 22. Furthermore, the valve portion of the speed-controlled valve device 11 need not necessarily directly control the supply of fluid under pressure to the brake cylinder 10 but may control additional relay valves, which in turn control the supply of fluid under pressure to the brake cylinder.

It will also be understood that, if desired, an individual retardation controller may be provided for each speed-controlled valve device 11 on the train and also that types of retardation controllers other than that shown in the various embodiments may be employed. For example, one or more retardation controllers of the flywheel type, shown and claimed in the copending application Serial No. 111,690 of Joseph C. McCune filed November 19, 1936 and assigned to the same assignee as is the present application, may be employed, one retardation controller for all speed-controlled valve devices 11 or an individual retardation controller for each speed-controlled valve device 11 on the train.

Summary

It will be seen that I have disclosed various embodiments of my invention wherein the degree of braking force depends upon the speed of the train and also the rate of retardation of the train. It will be seen that in all of the embodiments shown and described, the retardation controller is effective to vary the braking force over a wide range in each of a plurality of speed ranges depending upon the rate of retardation.

While I have shown and described several embodiments of my invention, it will be apparent that the various embodiments are capable of modification without departing from the spirit of the invention, and it is accordingly not my intention to limit the scope of my invention except as it is necessitated by the scope of the prior art and otherwise than as defined in the appended claims.

Having now described my invention, what I claim as new and desire to secure by Letters Patent, is:

1. In a vehicle or train brake system, in combination, means responsive to variations in the speed of the vehicle or train, inertia means responsive to variations in the rate of retardation of the vehicle or train, brake control means controlled by the speed-responsive means and by the inertia means for controlling the degree of the braking force during an application of the brakes, and fluid pressure responsive means for varying the response of the inertia means to variations in the rate of retardation of the vehicle or train.

2. In a vehicle or train brake system, in combination, a brake pipe normally charged with fluid under pressure, means conditioned responsively to the speed of the vehicle or train, inertia means conditioned responsively to the rate of retardation of the vehicle or train, brake control means operative upon a reduction in brake pipe pressure to effect an application of the brakes, said brake control means being controlled by the speed-responsive means and by the inertia means to vary the degree of braking force during an application of the brakes, and means operative upon a reduction in brake pipe pressure to below a certain uniform pressure for altering the response of the inertia means to variations in the rate of retardation.

3. In a vehicle or train brake system, in combination, means operative to effect application of the brakes with a plurality of certain different uniform degrees of braking force, means responsive to the speed of the train for so controlling the brake application means as to cause it to establish a different one of said certain degrees of braking force for each of a plurality of different ranges of train speed, and means effective jointly with the speed-responsive means when the rate of retardation of the vehicle is within a certain range of rates for so controlling the brake control means as to cause it to establish one of said certain uniform degrees of braking force other than the one which would be effected solely under the control of the speed responsive means, the said other of the certain uniform degrees being different in each different speed range.

4. In a vehicle or train brake system, in combination, means operative to effect application of the brakes with a plurality of certain different uniform degrees of braking force, means responsive to the speed of the train for so controlling the brake application means as to cause it to establish a certain one of said certain degrees of braking force different for each of a plurality of different ranges of train speed, and means responsive to variations in the rate of retardation of the vehicle or train for so controlling the brake control means as to cause it to establish any one of a plurality of said certain uniform degrees of braking force, other than the said certain one therefor for each different speed range.

5. In a vehicle or train brake system, in combination, means including a plurality of electroresponsive means for establishing a plurality of different uniform degrees of braking force dependent upon the particular electroresponsive means energized or deenergized, a relay device controlled according to the speed of the train, a relay device controlled according to the rate of retardation of the train, said relay devices jointly controlling said plurality of electroresponsive means.

6. In a vehicle or train brake system, in combination, means including a plurality of electroresponsive means for establishing a plurality of different uniform degrees of braking force dependent upon the particular electroresponsive means energized or deenergized, a relay device controlled according to the speed of the train and a relay device controlled according to the rate of retardation of the vehicle or train, said two relay devices each having a plurality of contact members, the contact members of one relay being connected in series with corresponding contact members of the other relay to jointly control the circuits for effecting energization of said plurality of electroresponsive means.

7. In a vehicle or train brake system, in combination, means including two electroresponsive means and effective to establish a plurality of different uniform degrees of braking force dependent upon either or both of the electroresponsive means being energized or deenergized, a relay device controlled according to the speed of the train, and a relay device controlled according to the rate of retardation of the vehicle or train, said two relay devices being effective jointly at one time to effect energization of one of the electroresponsive means and effective jointly at another time to effect energization of the other electroresponsive means.

8. In a vehicle or train brake system, in combination, means having an electroresponsive means and effective when the electroresponsive means is energized, to establish a certain braking force and, when the electroresponsive means is deenergized, to establish a certain lower braking force, a first relay device controlled according to the speed of the vehicle or train, a second relay device and a third relay device controlled according to the rate of retardation of the vehicle or train, said first and second relay devices being effective jointly to cause energization of the electroresponsive means when the speed of the vehicle or train is in excess of a certain uniform speed and the rate of retardation of the vehicle is less than a certain uniform rate, said first relay device and said third relay device being effective to cause energization of the electroresponsive means when the speed of the vehicle or train is less than said certain speed and as long as the rate of retardation of the train is within a certain range of retardation rates less than the said certain uniform retardation rate.

9. In a vehicle or train brake system, in combination, brake control means having electroresponsive means and effective to cause application of the brakes with one degree of braking force when the electroresponsive means is energized and with a different degree of braking force when the electroresponsive means is deenergized, a relay device having one position when the speed of the vehicle or train exceeds a certain uniform speed and a second position when the speed of the vehicle or train is below said certain speed, a relay device having one position when the retardation of the vehicle or train is within a certain range and having another position when the rate of retardation of the vehicle or train is outside said range, a second relay device having one position when the rate of retardation of the vehicle or train is within a second certain range, outside said first range, and having a second position when the rate of retardation of the vehicle is outside said second range, the speed-controlled relay device and the first retardation-controlled relay device being jointly effective when the speed of the vehicle is in excess of said certain uniform speed and the rate of retardation of the vehicle is outside the first said range of retardation rates for effecting energization of the electroresponsive means, said speed-controlled relay device and the second retardation-controlled relay device being jointly effective when the speed of the train is below said certain uniform speed and the rate of retardation of the vehicle or train is within the second said range of retardation rates for also effecting energization of said electroresponsive means.

10. In a vehicle or train brake system, in combination, means including a first electroresponsive means and a second electroresponsive means said means being effective when the said first electroresponsive means, is energized and the said second electroresponsive means is deenergized to establish a certain degree of braking force, effective when both of the electroresponsive means are deenergized to establish a second certain uniform degree of braking force less than the first uniform degree of braking force, and effective when the first electroresponsive means is deenergized and the second electroresponsive means is energized to establish a third certain uniform degree of braking force less than the second certain uniform degree of braking force, a relay device which is shifted from one position to a second position when the speed of the train exceeds a certain uniform speed, a relay device which is shifted from one position to a second position when the rate of retardation of the vehicle or train exceeds a certain rate, said first relay device being effective in the said second position thereof conjointly with the second relay device in the said first position thereof to cause energization of the first electroresponsive means, the second relay device being effective in its said second position, when the speed of the vehicle or train exceeds the said certain uniform rate and the said first relay device is in its said second position, to effect deenergization of the said first electroresponsive means, said first and said second relay devices being effective in the said first and said second positions thereof, respectively, to effect energization of the said second electroresponsive means.

11. In a vehicle or train brake system, in combination, means including a first electroresponsive means and a second electroresponsive means, said means being effective when the said first electroresponsive means is energized and the said second electroresponsive means is deenergized to establish a certain degree of braking force, effective when both of the electroresponsive means are deenergized to establish a second certain uniform degree of braking force less than the first uniform degree of braking force, and effective when the first electroresponsive means is deenergized and the second electroresponsive means is energized to establish a third certain uniform degree of braking force less than the second certain uniform degree of braking force, a relay device which is shifted from one position to a second position when the speed of the train exceeds a certain uniform speed, a relay device which is shifted from one position to a second position when the rate of retardation of the vehicle or train exceeds a certain rate, the first relay device being effective in the said second position thereof conjointly with the second relay device in the said first position thereof to cause energization of the first electroresponsive means, said second relay device being effective in its said second position, when the speed of the vehicle or train exceeds the said certain uniform rate and the said first relay device is in its said second position, to effect deenergization of the said first electroresponsive means, said first and said second relay devices being effective jointly in the said one and said second positions thereof, respectively, to effect energization of the said second electroresponsive means.

12. In a vehicle or train brake system, in combination, means having a plurality of electroresponsive means and effective to establish a plurality of different uniform degrees of braking force depending upon the number of electroresponsive means energized or deenergized, a relay device controlled according to the speed of the train, a relay device controlled according to the rate of retardation of the vehicle or train and effective jointly with the speed-controlled relay device for controlling one of said electroresponsive means, and a second relay device controlled according to the rate of retardation of the train and effective jointly with the speed-controlled relay device for controlling another of said electroresponsive means.

13. In a vehicle or train brake system, in combination, means having two electroresponsive means and effective to establish a plurality of different uniform degrees of braking force depending upon whether one or both of the electroresponsive means are energized or deenergized, a relay device actuated to circuit-closing position only when the speed of the train exceeds a certain uniform speed, a relay device effective jointly with the speed-controlled relay device for controlling the circuit of one of the electroresponsive means and actuated to circuit-closing position only while the rate of retardation of the vehicle or train is within a certain range of retardation rates, and a second relay device effective jointly with the speed-controlled relay device for controlling the circuit of the other electroresponsive means and actuated to a circuit-opening position from a circuit-closing position only when the rate of retardation of the vehicle or train exceeds a certain rate higher than the maximum rate of the said certain range of retardation rates.

14. In a vehicle or train brake system, in combination, brake control means having a plurality of electroresponsive means and effective, upon an application of the brakes, to establish certain different uniform degrees of braking force dependent upon which of the electroresponsive means are energized or deenergized, a first relay device and a second relay device controlled according to the speed of the vehicle or train and a third relay device controlled according to the rate of retardation of the vehicle or train, said first relay device and said third relay device being effective jointly when the speed of the vehicle or train exceeds a first certain uniform speed and the rate of retardation of the vehicle is less than a certain uniform rate for effecting energization of one of the said electroresponsive means, said second relay device and said third relay device being jointly effective as long as the speed of the vehicle or train exceeds a second certain uniform speed lower than the said first uniform speed and the rate of retardation of the vehicle or train is less than the said certain uniform rate for effecting energization of another of said electroresponsive means.

15. In a vehicle or train brake system, in combination, brake control means having a plurality of electroresponsive means and effective upon an application of the brakes to establish certain different uniform degrees of braking force dependent upon which of the electroresponsive means are energized or deenergized, a first relay device and a second relay device controlled according to the speed of the vehicle or train and a third relay device controlled according to the rate of retardation of the vehicle or train, said first relay device and said third relay device being effective jointly when the speed of the vehicle or train exceeds a first certain uniform speed and the rate of retardation of the vehicle is less than a certain uniform rate for effecting energization of one of the said electroresponsive means, said second relay device and said third relay device being jointly effective as long as the speed of the vehicle or train exceeds a second certain uniform speed lower than the said first uniform speed and the rate of retardation of the vehicle or train is less than the said certain uniform rate for effecting energization of another of said electroresponsive means, said third relay device being effective whenever the rate of retardation of the vehicle or train exceeds the said uniform rate for effecting deenergization of the said one electroresponsive means, and said first and said second relay devices being effective to maintain said other electroresponsive means energized as long as the speed of the vehicle or train exceeds the first said uniform speed notwithstanding that the rate of retardation of the vehicle or train exceeds the said certain uniform rate.

16. The method of controlling the brakes of a vehicle or train which comprises controlling the degree of the braking force in accordance with variations in the speed of the vehicle or train for a certain length of time following the initiation of the application of the brakes and, upon the elapse of the certain length of time, controlling the degree of the braking force in accordance with variations in the rate of retardation of the vehicle or train.

17. The method of controlling the brakes of a vehicle or train which comprises establishing an initial degree of braking force in accordance with the speed of the vehicle or train at the time the application of the brakes is initiated, then controlling the degree of the braking force in accordance with variations in the speed of the vehicle or train for a certain length of time following the initiation of the application, and finally, upon the elapse of the certain length of time, controlling the degree of the braking force according to variations in the rate of retardation of the vehicle or train.

18. In a vehicle or train brake system, in combination, control means for varying the degree of braking force, means responsive to the speed of the vehicle or train for controlling said control means, a retardation controller for also controlling said control means, and timing means for causing the speed-responsive means to be effective to control the control means for a certain uniform length of time following the initiation of an application of the brakes, and for thereafter rendering the retardation controller effective and the speed responsive means non-effective to control the control means.

19. In a vehicle or train brake system, brake control means having a plurality of electroresponsive means and effective to establish any one of a plurality of different uniform degrees of braking force depending upon any or all of the electroresponsive means being energized or deenergized, means responsive to variations in the speed of the train for controlling the energization and deenergization of all of said electroresponsive means, means responsive to variations in the rate of retardation of the vehicle or train for controlling the energization and deenergization of all of the electroresponsive means, and means for rendering only the speed-responsive means effective to control the electroresponsive means at one time and only the retardation-responsive means effective to control the electroresponsive means at another time.

20. In a vehicle or train brake system, in combination, control means effective to cause application of the brakes with a plurality of certain different uniform degrees of braking force, means responsive to the speed of the vehicle or train for controlling the control means to establish a different one of said certain uniform degrees of braking force for each of a plurality of different speed ranges, a retardation controller for controlling the control means to establish a different one of said certain degrees of braking force for each of a plurality of different ranges of retardation rates, and means effective until a certain uniform time has elapsed following the initiation of an application of the brakes for rendering the speed-responsive means effective and the retardation controller non-effective to control the control means and operative, upon the elapse of said certain uniform time, for rendering the speed-responsive means non-effective and the retardation controller effective to control the control means.

21. In a vehicle or train brake system, in combination, means including two electroresponsive means and operative to establish different uniform degrees of braking force depending upon whether one or both of the electroresponsive means are energized or deenergized, means responsive to the speed of the train effective, upon initiation of an application of the brakes, when the speed of the vehicle or train exceeds a certain uniform speed for effecting energization of both of the electroresponsive means and when the speed of the train exceeds a second certain uniform speed lower than the first uniform speed but is not in excess of the first uniform speed for effecting energization of only one of said electroresponsive means, a retardation controller for effecting energization or deenergization of one or both of the said two electroresponsive means independently of the speed-responsive means, and means effective for a predetermined uniform time following the initiation of the application of the brakes for rendering the speed-responsive means effective to control both of the electroresponsive means and the retardation controller non-effective to control either of the electroresponsive means, and operative upon the elapse of the predetermined uniform time for rendering the speed-responsive means non-effective to control either of the electroresponsive means and the retardation controller effective to control both of the electroresponsive means.

22. In a vehicle or train brake system, in combination, means including a first, second and third electroresponsive means, said means being effective when the first and second electroresponsive means are energized and the third is deenergized to establish a certain degree of braking force, effective when the second electroresponsive means is energized and the first and third electroresponsive means are deenergized to establish a second certain uniform degree of braking force lower than the first uniform degree of braking force, effective when all of the electroresponsive means are deenergized to establish a third degree of braking force lower than the second uniform degree of braking force, and effective when the first and second electroresponsive means are deenergized and the third electroresponsive means is energized to establish a fourth uniform degree of braking force lower than the third degree of braking force, means responsive to the speed of the vehicle or train and effective upon the initiation of an application of the brakes to so control the electroresponsive means as to establish a different one of said certain uniform degrees of braking force for different ranges of speeds, a retardation controller for so controlling the electroresponsive means as to effect different ones of said certain uniform degrees of braking force for different ranges of retardation rates of the vehicle or train, and means effective for a certain uniform length of time following the initiation of an application of the brakes for rendering the speed-responsive means effective to control the electroresponsive means and for rendering the retardation controller non-effective, and operative upon the elapse of the certain uniform time for rendering the speed-responsive means non-effective and the retardation controller effective to control the said electroresponsive means.

23. In a vehicle or train brake system, in combination, brake control means having a first, a second, and a third electroresponsive means and effective upon an application of the brakes to establish one of a plurality of certain different uniform degrees of braking force dependent upon which of the electroresponsive means are energized or deenergized, a first relay device, a second relay device, and a third relay device, controlled according to the speed of the vehicle or train, and a fourth relay device controlled according to the rate of retardation of the vehicle or train, said first relay device and said fourth relay device being jointly effective only so long as the speed of the vehicle or train exceeds a first certain uniform speed and the rate of retardation of the vehicle or train does not exceed a certain uniform rate for effecting energization of the said first electroresponsive means, said second relay device and said fourth relay device being jointly effective only so long as the speed of the vehicle or train exceeds a second certain uniform speed lower than the said first certain uniform speed and the rate of retardation of the vehicle or train does not exceed the said certain uniform rate for effecting energization of said second electroresponsive means, and said third relay device being effective whenever the speed of the vehicle or train reduces below a third certain uniform speed lower than the said second certain uniform speed for effecting energization of the said third electroresponsive means.

24. In a vehicle or train brake system, in combination, brake control means having a first, a second, and a third electroresponsive means and effective upon an application of the brakes to establish one of a plurality of certain different uniform degrees of braking force dependent upon which of the electroresponsive means are energized or deenergized, a first relay device, a second relay device, and a third relay device, controlled according to the speed of the vehicle or train, and a fourth relay device controlled according to the rate of retardation of the vehicle or train, said first relay device and said fourth relay device being jointly effective only so long as the speed of the vehicle or train exceeds a first certain uniform speed and the rate of retardation of the vehicle or train does not exceed a certain uniform rate for effecting energization of the said first electroresponsive means, said second relay device and said fourth relay device being jointly effective only so long as the speed of the vehicle or train exceeds a second uniform speed lower than the said first uniform speed and the rate of retardation of the vehicle or train does not exceed the said certain uniform rate for effecting energization of said second electroresponsive means, said third relay device being effective whenever the speed of the vehicle or train reduces below a third certain uniform speed lower than the said second certain uniform speed for effecting energization of the said third electroresponsive means, said fourth relay device being effective whenever the rate of retardation of the vehicle or train exceeds the said uniform rate for causing deenergization of the said first electroresponsive means and effective when the retardation of the vehicle exceeds said uniform rate and the speed of the vehicle is less than said first uniform speed for causing deenergization of said second electroresponsive means, and said first and said second relay devices being jointly effective to cause the said second electroresponsive means to remain energized, although the rate of retardation of the vehicle exceeds the said certain uniform rate, as long as the speed of the vehicle exceeds the said first certain uniform rate.

25. In a vehicle or train brake system, in combination, brake control means having a first, a second, and a third electroresponsive means and effective upon an application of the brakes to establish one of a plurality of certain different uniform degrees of braking force dependent upon which of the electroresponsive means are energized or deenergized, a first relay device, a second relay device, and a third relay device, controlled according to the speed of the vehicle or train, and a fourth relay device controlled according to the rate of retardation of the vehicle or train, said first relay device and said fourth relay device being jointly effective only so long as the speed of the vehicle or train exceeds a first certain uniform speed and the rate of retardation of the vehicle or train does not exceed a certain uniform rate for effecting energization of the said first electroresponsive means, said second relay device and said fourth relay device being jointly effective only so long as the speed of the vehicle or train exceeds a second certain uniform speed lower than the said first certain uniform speed and the rate of retardation of the vehicle or train does not exceed the said certain uniform rate for effecting energization of said second electroresponsive means, and said third relay device being effective whenever the speed of the vehicle or train reduces below a third certain uniform speed lower than the said second certain uniform speed for effecting energization of the said third electroresponesive means, said second and said fourth relay devices being jointly effective when the speed of the vehicle or train is higher than the said third uniform speed but lower than the said second uniform speed and the rate of retardation of the vehicle or train exceeds the said certain uniform rate for effecting energization of the said third electroresponsive means.

26. In a vehicle or train brake system, in combination, means, including a first electroresponsive means and a second electroresponsive means, for controlling the degree of braking force effecting an application of the brakes, said control means being effective when the first electroresponsive means is energized and the second electroresponsive means is deenergized for establishing a certain degree of braking force, effective when both the first and the second electroresponsive means are deenergized for establishing a second certain degree of braking force lower than the first said certain degree, and effective when the first electroresponsive means is deenergized and the second electroresponsive means is energized for establishing a third certain degree of braking force lower than the said second certain degree, and a retardation controller responsive to the rate of retardation of the vehicle and effective to selectively control energization and deenergization of said first and second electroresponsive means according to the rate of retardation of the vehicle.

27. In a vehicle or train brake system, in combination, means, including a first electroresponsive means and a second electroresponsive means, for controlling the degree of braking force effecting an application of the brakes, said control means being effective when the first electroresponsive means is energized and the second electroresponsive means is deenergized for establishing a certain degree of braking force, effective when both the first and the second electroresponsive means are deenergized for establishing a second certain degree of braking force lower than the first said certain degree, and effective when the first electroresponsive means is deenergized and the second electroresponsive means is energized for establishing a third certain degree of braking force lower than the said second certain degree, and a retardation controller responsive to the rate of retardation of the vehicle and effective as long as the retardation of the vehicle is within a certain range of rates for effecting energization of only said first electroresponsive means, effective when the retardation of the vehicle is within a range of rates higher than said certain range for effecting deenergization of both the electroresponsive means, and effective when the retardation of the vehicle exceeds the maximum rate in said second range for effecting energization of only said second electroresponsive means.

28. In a vehicle or train brake system, in combination, means including a first, a second, and a third electroresponsive means, for controlling the degree of braking force effecting an application of the brakes, said control means being effective when the first and second electroresponsive means are energized and the third electroresponsive means is deenergized for establishing a certain degree of braking force, effective when only the second electroresponsive means is energized for establishing a second certain degree of braking force less than the first said certain degree, effective when all of the electroresponsive means are deenergized for establishing a third certain degree of braking force less than said second certain degree, and effective when only the third electroresponsive means is energized for establishing a fourth certain degree of braking force less than said third certain degree, and a retardation controller responsive to the retardation of the vehicle and effective to selectively cause energization and deenergization of said three electroresponsive means according to the rate of retardation of the vehicle.

29. In a vehicle or train brake system, in combination, means including a first, a second, and a third electroresponsive means, for controlling the degree of braking force effecting an application of the brakes, said control means being effective when the first and second electroresponsive means are energized and the third electroresponsive means is deenergized for establishing a certain degree of braking force, effective when only the second electroresponsive means is energized for establishing a second certain degree of braking force less than the first said certain degree, effective when all of the electroresponsive means are deenergized for establishing a third certain degree of braking force less than said second certain degree, and effective when only the third electroresponsive means is energized for establishing a fourth certain degree of braking force less than said third certain degree, and a retardation controller responsive to the retardation of the vehicle and effective when the retardation of the vehicle is less than a certain uniform rate for causing energization of only said first and said second electroresponsive means, effective when the retardation of the vehicle is between said certain uniform rate and a second higher certain uniform rate for effecting energization of only the said second electroresponsive means, effective when the retardation of the vehicle exceeds said second certain uniform rate but is less than a third certain uniform rate higher than said second certain uniform rate for effecting deenergization of all the electroresponsive means, and effective when the retardation of the vehicle exceeds said third certain uniform rate for effecting energization of only the said third electroresponsive means.

GEORGE W. BAUGHMAN.